United States Patent
Kurita et al.

(10) Patent No.: US 11,573,717 B2
(45) Date of Patent: Feb. 7, 2023

(54) STORAGE DEVICE HAVING A CONTROLLER CONFIGURED TO SELECT MODES AS WRITE MODES BASED ON RECEIVED INSTRUCTIONS, STORAGE SYSTEM, AND CONTROL METHOD

(71) Applicant: Kioxia Corporation, Tokyo (JP)

(72) Inventors: Takahiro Kurita, Sagamihara (JP); Tetsuya Sunata, Yokohama (JP); Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/201,559

(22) Filed: Mar. 15, 2021

(65) Prior Publication Data

US 2021/0405900 A1    Dec. 30, 2021

(30) Foreign Application Priority Data

Jun. 25, 2020 (JP) ............................. JP2020-109978

(51) Int. Cl.
*G06F 3/06* (2006.01)

(52) U.S. Cl.
CPC .......... *G06F 3/0634* (2013.01); *G06F 3/0604* (2013.01); *G06F 3/0659* (2013.01); *G06F 3/0679* (2013.01)

(58) Field of Classification Search
CPC ...... G06F 3/0604; G06F 3/061; G06F 3/0634; G06F 3/0644; G06F 3/0659; G06F 3/0679
See application file for complete search history.

(56) References Cited

U.S. PATENT DOCUMENTS

| | | | |
|---|---|---|---|
| 10,614,888 B2 | 4/2020 | Igahara et al. | |
| 2006/0161706 A1* | 7/2006 | Iyer | G06F 13/28 710/243 |
| 2006/0253645 A1* | 11/2006 | Lasser | G06F 12/0246 711/E12.008 |
| 2012/0005415 A1* | 1/2012 | Jung | G06F 12/0246 711/E12.008 |
| 2014/0281127 A1* | 9/2014 | Marcu | G06F 12/0246 711/103 |
| 2015/0380110 A1* | 12/2015 | Tamura | G11C 29/44 711/103 |
| 2017/0068456 A1* | 3/2017 | Toge | G06F 11/1076 |
| 2017/0070244 A1* | 3/2017 | Nakanishi | G06F 3/064 |
| 2017/0177469 A1 | 6/2017 | Hashimoto | |

(Continued)

FOREIGN PATENT DOCUMENTS

| | | |
|---|---|---|
| JP | 2010-198407 A | 9/2010 |
| JP | 2018-120439 A | 8/2018 |
| JP | 2019-168822 A | 10/2019 |

*Primary Examiner* — Larry T MacKall
(74) *Attorney, Agent, or Firm* — Oblon, McClelland, Maier & Neustadt, L.L.P.

(57) ABSTRACT

According to one embodiment, a storage device includes a nonvolatile memory and a controller. The controller is configured to select a first mode as a write mode to write data from the host to the nonvolatile memory when the controller receives a first instruction from the host. In the first mode, n-bit data is written into a memory cell in a first area of the nonvolatile memory, n being a positive integer more than or equal to 1. The controller is configured to select another mode different from the first mode as the write mode when the controller receives a second instruction from the host.

12 Claims, 35 Drawing Sheets

(56) References Cited

U.S. PATENT DOCUMENTS

| | | | |
|---|---|---|---|
| 2018/0211708 A1* | 7/2018 | Igahara | G06F 3/0659 |
| 2019/0095116 A1* | 3/2019 | Igahara | G06F 3/0634 |
| 2019/0294365 A1 | 9/2019 | Yoshii et al. | |
| 2020/0293221 A1* | 9/2020 | Jang | G06F 12/0246 |
| 2021/0004324 A1* | 1/2021 | Kang | G06F 12/0246 |
| 2021/0141722 A1* | 5/2021 | Byun | G06F 12/0811 |
| 2021/0149796 A1* | 5/2021 | Nam | G06F 3/061 |
| 2021/0166746 A1* | 6/2021 | Lu | G11C 7/1015 |

\* cited by examiner

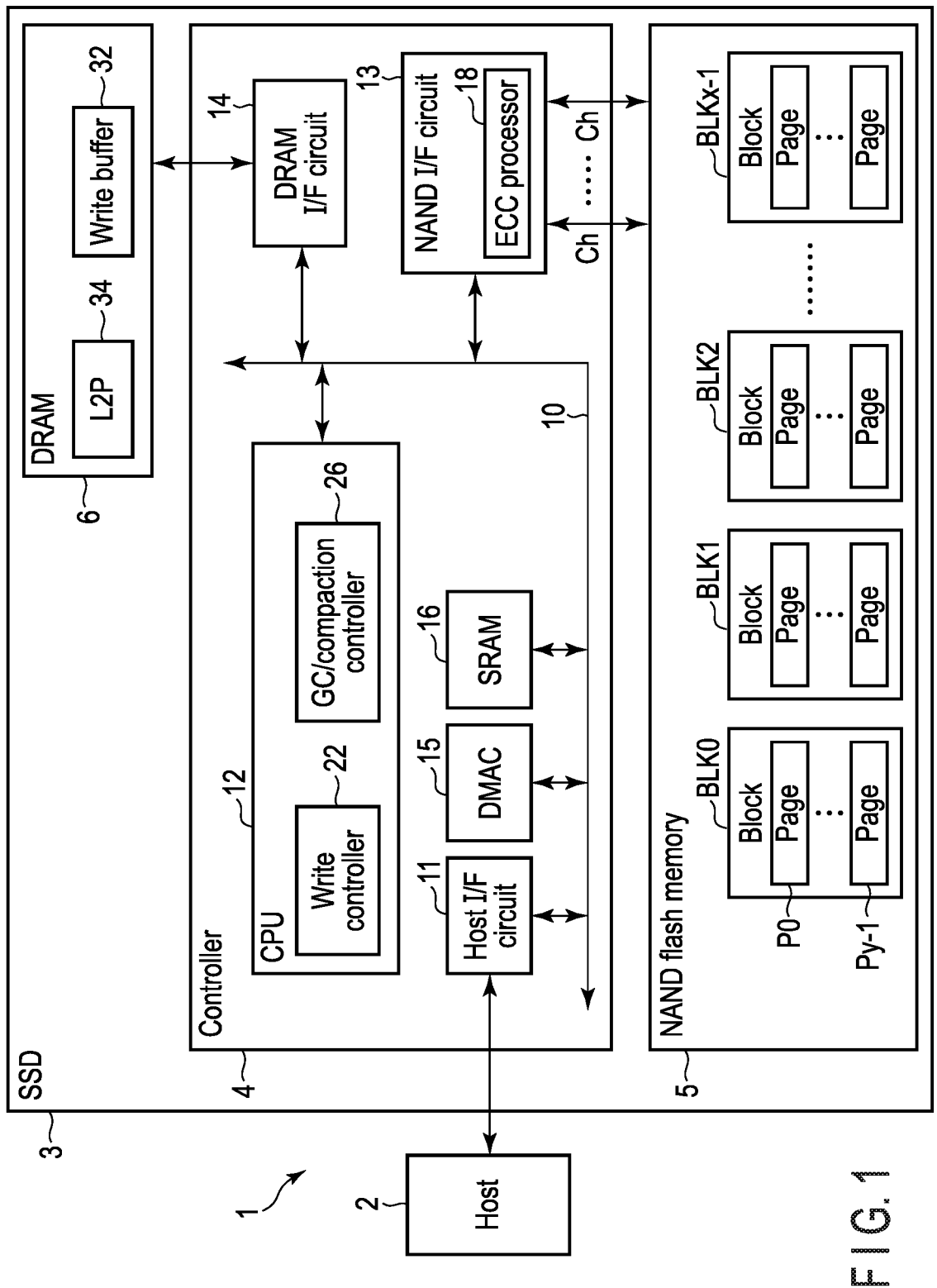
F I G. 1

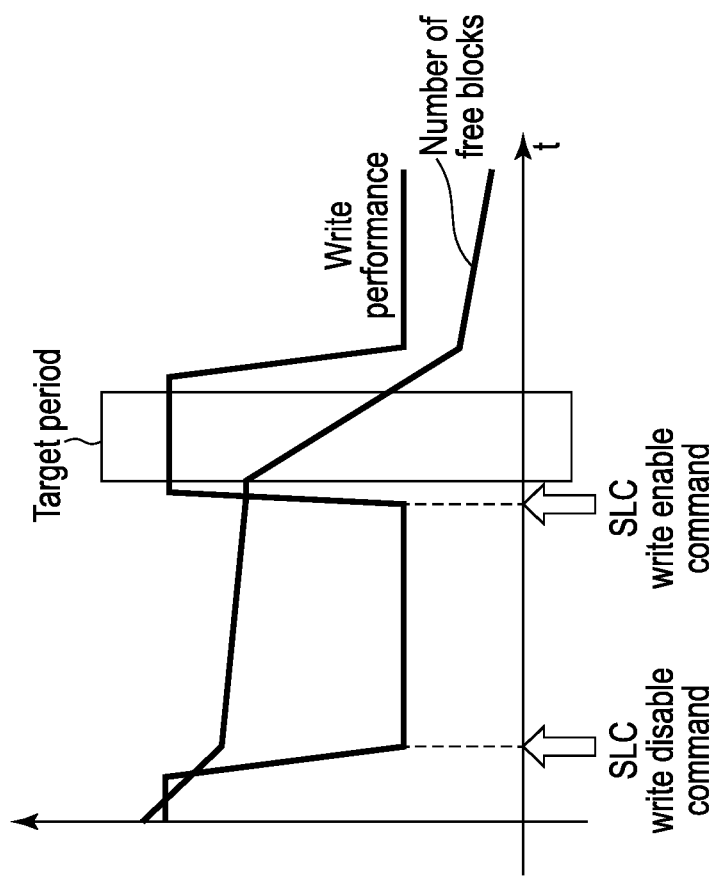
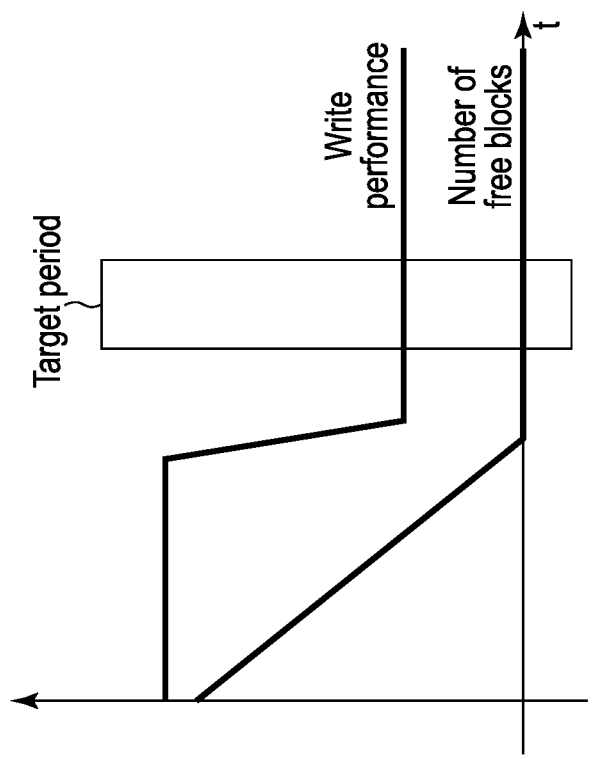
FIG. 11A
FIG. 11B

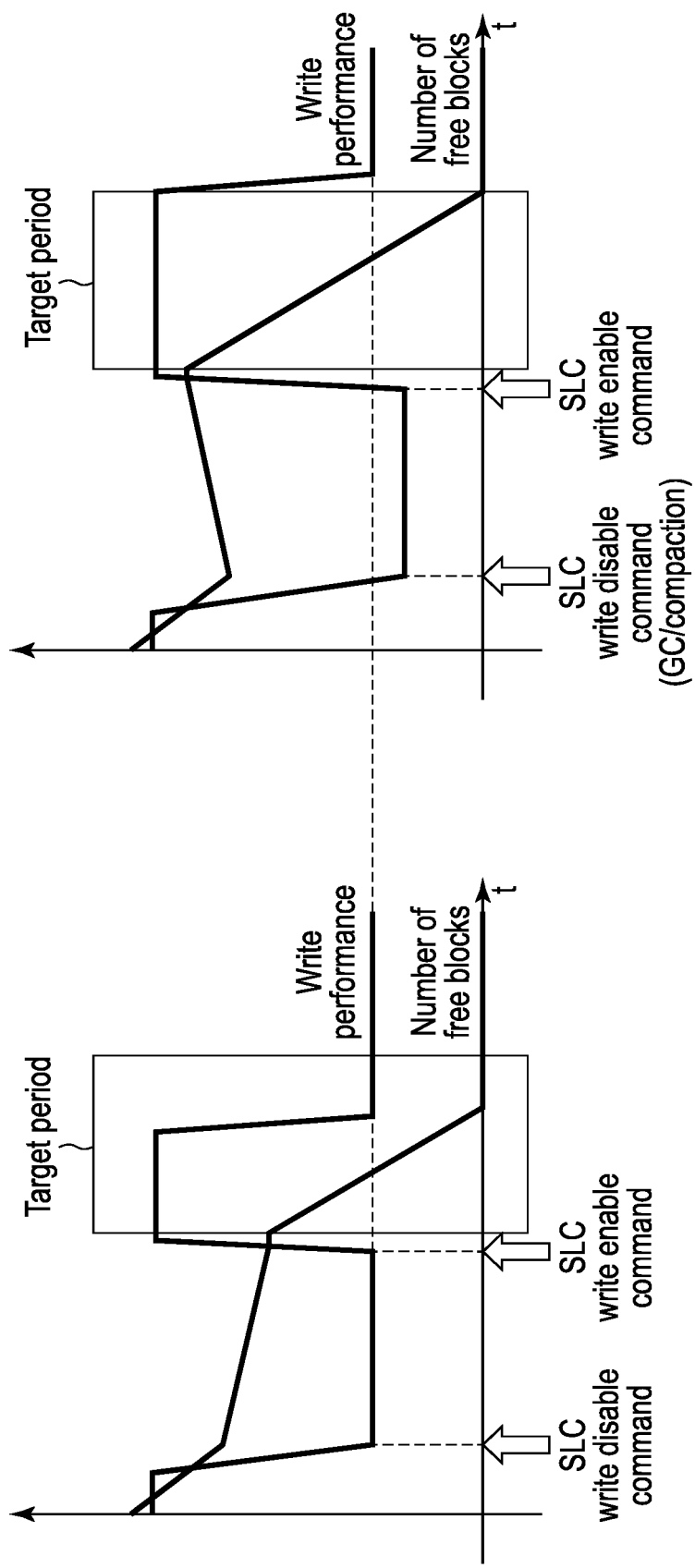
F I G. 15A
F I G. 15B

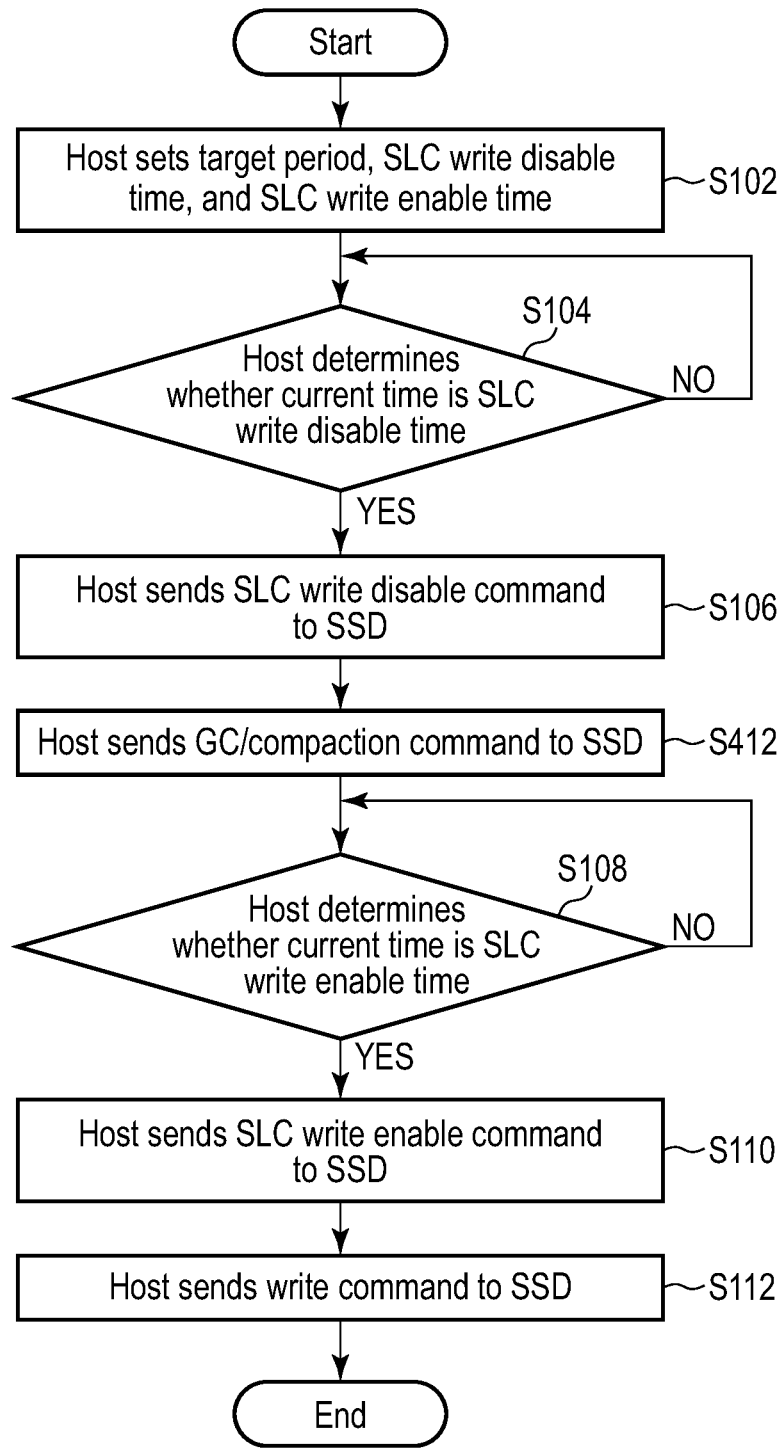
F I G. 16

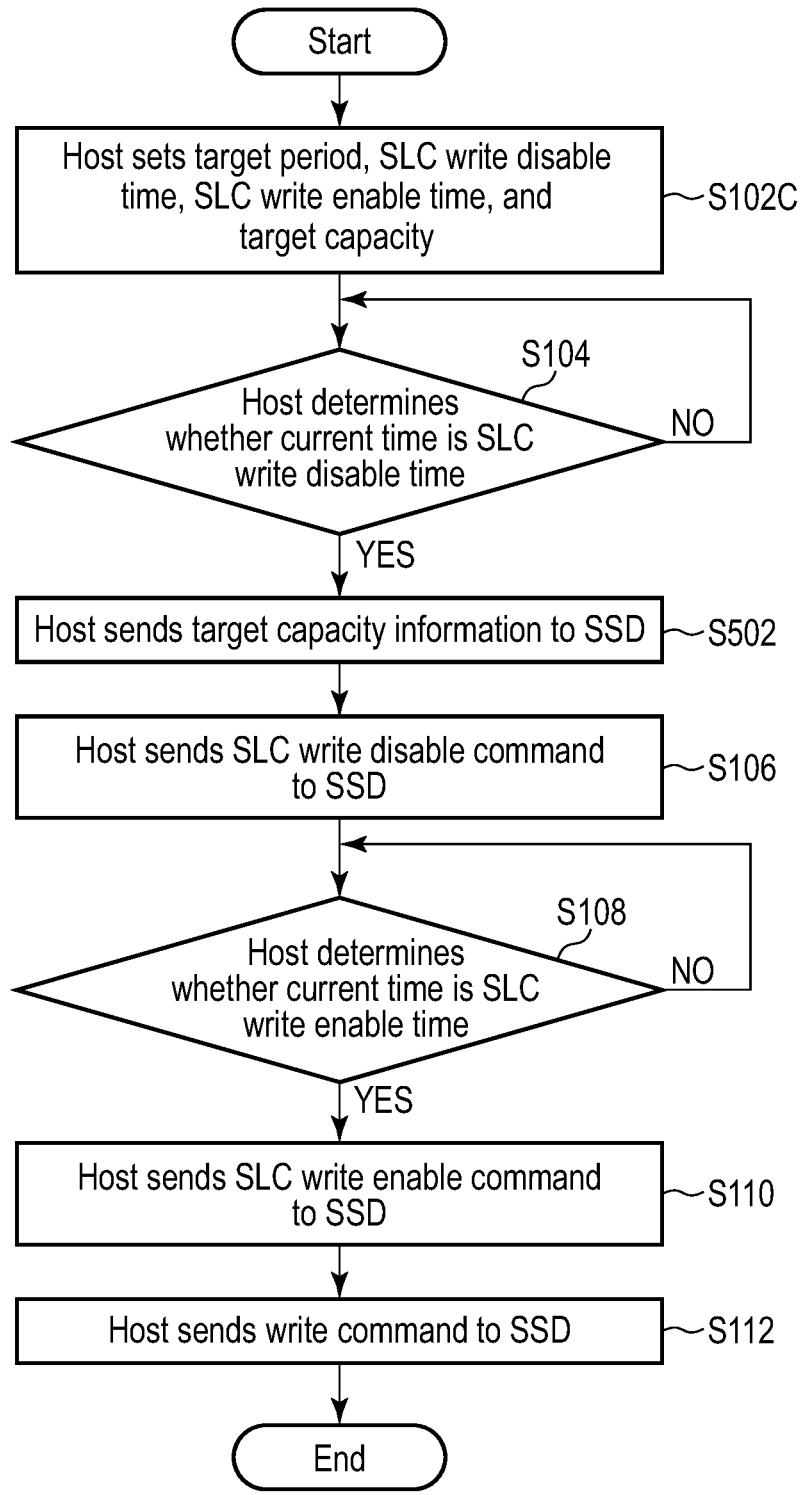
F I G. 18

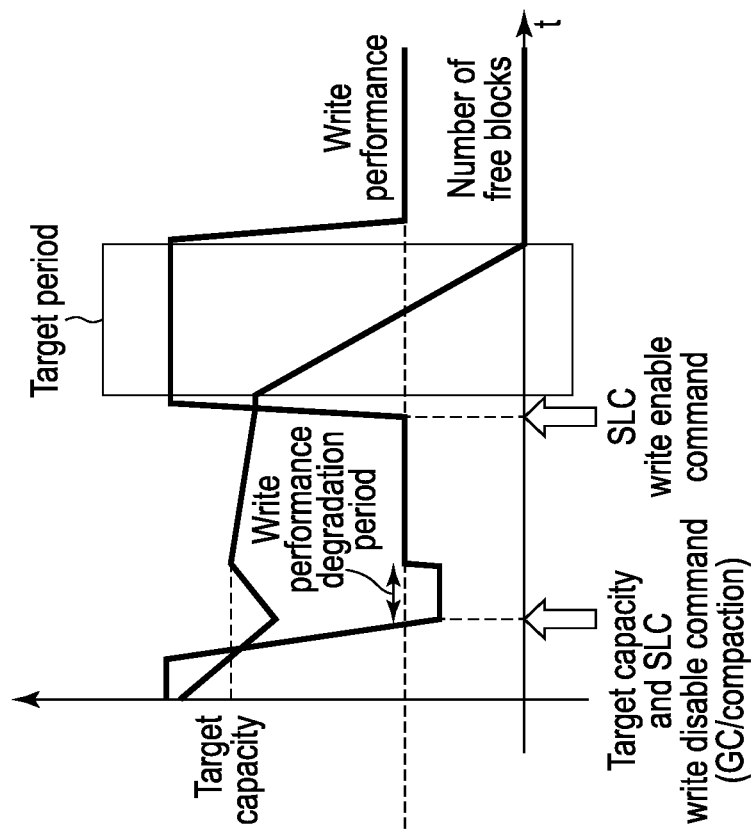
F I G. 20B
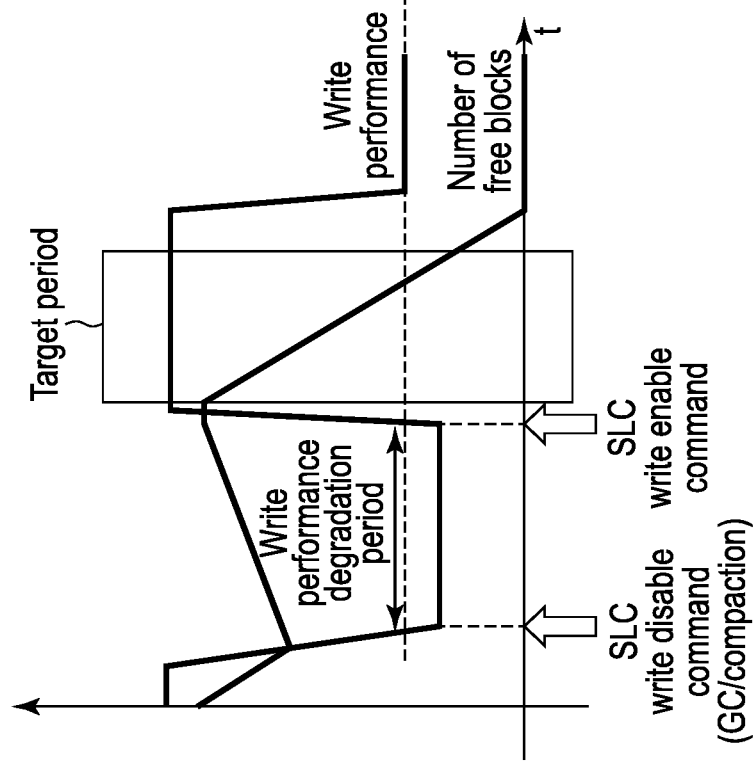
F I G. 20A

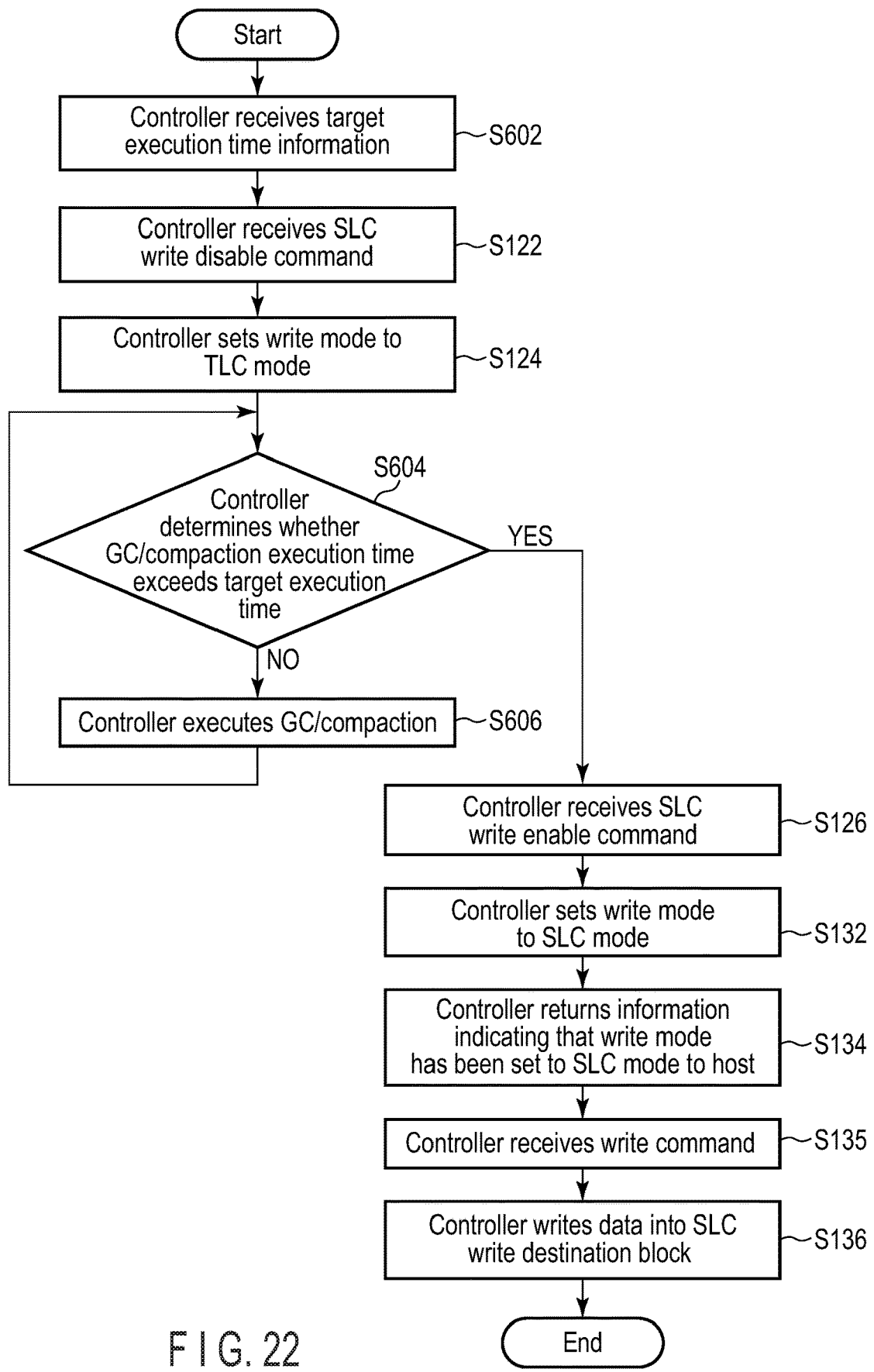
F I G. 22

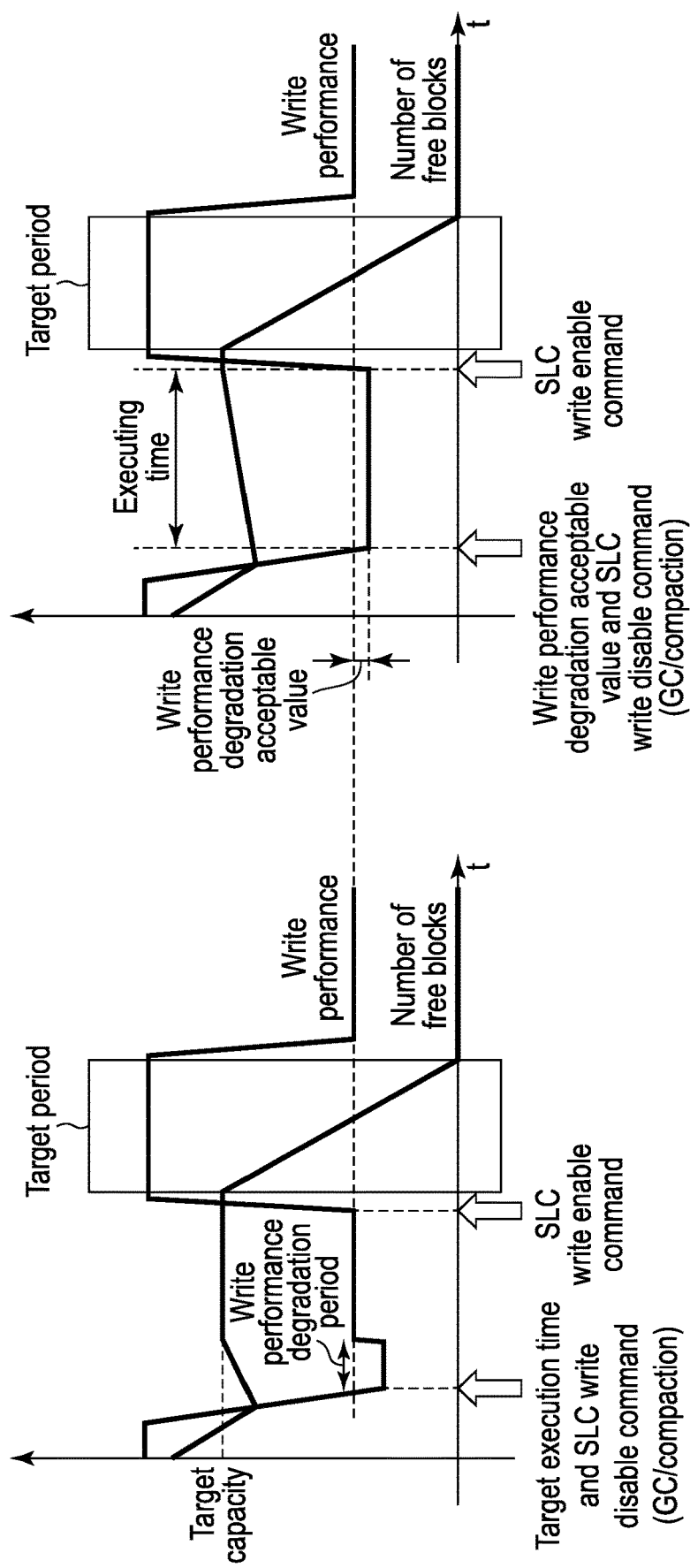
F I G. 26B
F I G. 26A

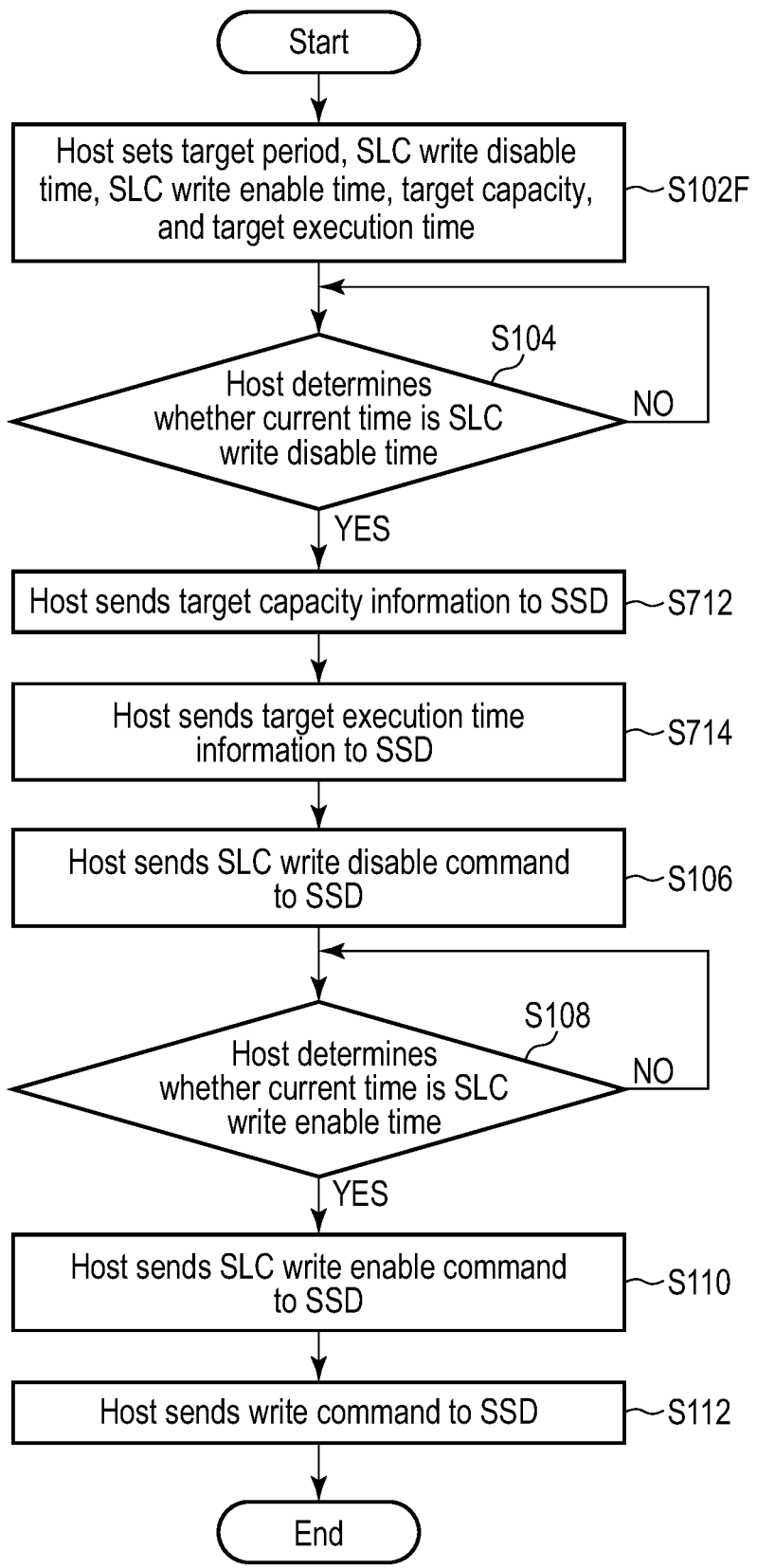
F I G. 27

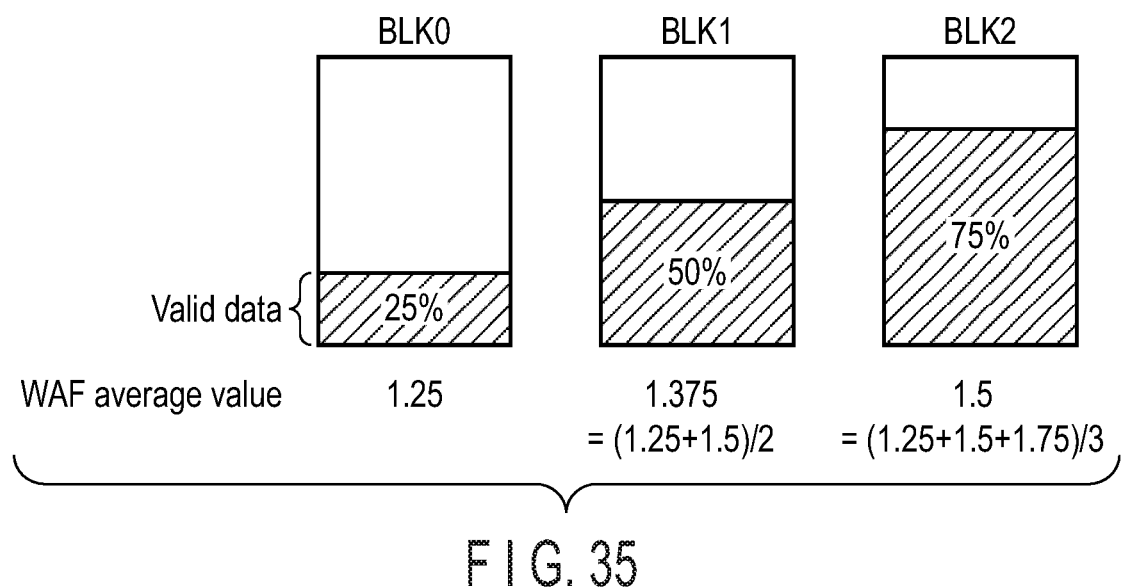
F I G. 35

STORAGE DEVICE HAVING A CONTROLLER CONFIGURED TO SELECT MODES AS WRITE MODES BASED ON RECEIVED INSTRUCTIONS, STORAGE SYSTEM, AND CONTROL METHOD

CROSS-REFERENCE TO RELATED APPLICATIONS

This application is based upon and claims the benefit of priority from Japanese Patent Application No. 2020-109978, filed Jun. 25, 2020, the entire contents of which are incorporated herein by reference.

FIELD

Embodiments described herein relate generally to a technology to control a nonvolatile memory.

BACKGROUND

A solid-state drive (SSD) including a nonvolatile memory is known as one of storage devices. The SSD receives data from a host device (hereinafter referred to as a host) and writes it to the nonvolatile memory.

An SSD including first and second write modes has been developed. In the first write mode, priority is given to a write speed. In the second write mode, priority is given to a data write size. The SSD selects one of the write modes based on a write state and the like.

However, the SSD determines its selection timing of the write mode. Therefore, write performance may not be increased at a timing desired by the host.

Embodiments described herein aim to provide a storage device, a storage system and a control method, which are capable of increasing write performance at a timing desired by a host.

BRIEF DESCRIPTION OF THE DRAWINGS

FIG. 1 is a block diagram showing an exemplary configuration of a storage system including a storage device according to a first embodiment.

FIG. 11A is a graph showing an example of changes in the number of free blocks and a write performance in a comparative example where an SSD sets a write mode.

FIG. 11B is a graph showing an example of changes in the number of the free blocks and the write performance in the second embodiment.

FIG. 15A is the graph showing the example of changes in the number of free blocks and the write performance in the first embodiment.

FIG. 15B is a graph showing an example of changes in the number of free blocks and the write performance in the fourth embodiment.

FIG. 16 is a flowchart showing another example of the write operation of the host of the storage system according to the fourth embodiment.

FIG. 18 is a flowchart showing an example of a write operation of a host of a storage system according to a fifth embodiment.

FIG. 20A is a graph showing an example of changes in the number of free blocks and a write performance in the fourth embodiment shown in FIG. 15B.

FIG. 20B is a graph showing an example of changes in the number of the free blocks and the write performance in the fifth embodiment.

FIG. 22 is a flowchart showing an example of a write operation of a storage device of the storage system according to the sixth embodiment.

FIG. 26A is a graph showing an example of changes in the number of free blocks and a write performance in the sixth embodiment shown in FIG. 23B.

FIG. 26B is a graph showing an example of changes in the number of the free blocks and the write performance in the seventh embodiment.

FIG. 27 is a flowchart showing an example of a write operation of a host of a storage system according to an eighth embodiment.

FIG. 35 illustrates the example of the write operation of the storage device according to the tenth embodiment.

DETAILED DESCRIPTION

Figure 2:
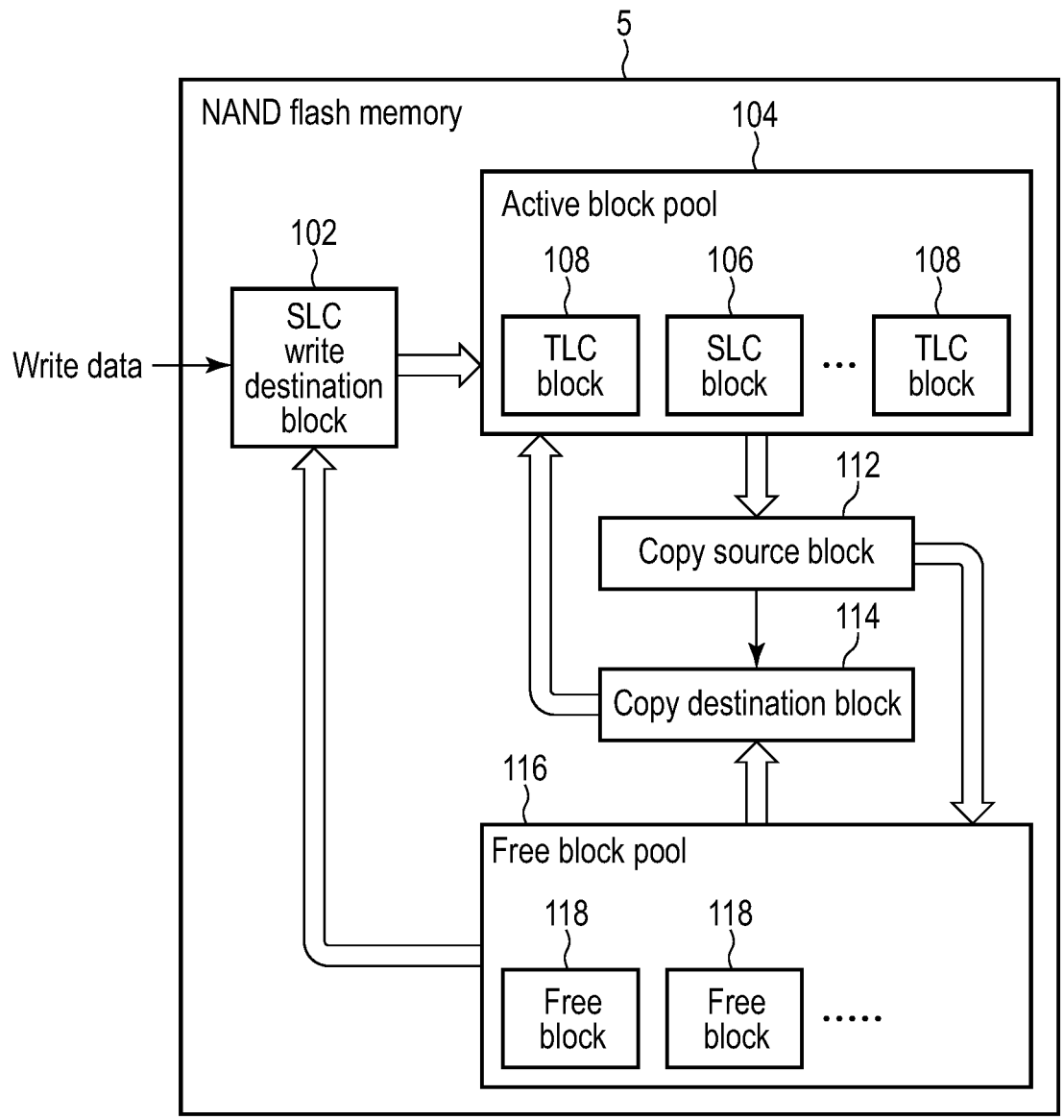
FIG. 2 is a block diagram showing an exemplary configuration of a NAND flash memory included in the storage device according to the first embodiment.

Embodiments will be described below with reference to the drawings. In the following description, a device and a method are illustrated to embody the technical concept of the embodiments, and the technical concept is not limited to the configuration, shape, arrangement, material, etc., of the structural elements described below. Modifications that could easily be conceived by a person with ordinary skill in the art are naturally included in the scope of the disclosure. To make the description clearer, the drawings may schematically show the size, thickness, planer dimension, shape, etc., of each element differently from those in the actual aspect. The drawings may include elements that differ in dimension and ratio. Elements corresponding to each other in the drawings are denoted by the same reference numeral and the overlapping descriptions may be omitted. Some elements may be denoted by different names, and these names are merely an example. It should not be denied that one element is denoted by different names. Note that "connected" in the following description means that one element is connected to another element via still another element as well as that one element is directly connected to another element.

In general, according to one embodiment, a storage device includes a nonvolatile memory and a controller. The controller is configured to select a first mode as a write mode to write data from the host to the nonvolatile memory when the controller receives a first instruction from the host. In the first mode, n-bit data is written into a memory cell in a first area of the nonvolatile memory, n being a positive integer more than or equal to 1. The controller is configured to select another mode different from the first mode as the write mode when the controller receives a second instruction from the host.

First Embodiment

The configuration of a storage system 1 including a storage device according to a first embodiment will be described. FIG. 1 is a block diagram showing an exemplary configuration of the storage system 1 including a storage device according to the first embodiment. The storage device is a semiconductor storage device configured to write data to a nonvolatile memory and read data from the nonvolatile memory. The nonvolatile memory is not limited to such an example but includes a NAND type flash memory. Hereinafter, the nonvolatile memory will be referred to as a NAND flash memory. The semiconductor storage device in this embodiment is an SSD 3 including a NAND flash memory 5.

The storage system 1 includes a host 2 and the SSD 3. The host 2 is an information processing device configured to control the SSD 3. The host 2 is, for example, a personal computer, a server computer, a mobile terminal, and an in-vehicle device.

An example in which the SSD 3 is connected to the host 2 via a cable is shown in FIG. 1. The SSD 3 may be connected to the host 2 via a network or may be built in the host 2.

An interface for connecting the host 2 and the SSD 3 is not limited to one in this embodiment. SATA (serial ATA), an SAS (serial attached SCSI), a UFS (universal flash storage), PCI Express (PCIe)™, and Ethernet™ can be used.

The SSD 3 includes a controller 4, the NAND flash memory 5, and a DRAM 6.

The NAND flash memory 5 includes a plurality of memory cells arranged in a matrix. The NAND flash memory 5 may be a flash memory having a two-dimensional structure or a flash memory having a three-dimensional structure. The NAND flash memory 5 may include a plurality of NAND flash memory chips, i.e. a plurality of NAND flash memory dies. Each of the chips may be implemented as a flash memory configured to store data of one or more bits per memory cell.

The flash memory configured to store data of one bit per memory cell is referred to as a single-level cell (SLC) flash memory capable of storing data of one bit per memory cell. The flash memory configured to store data of a plurality of bits per memory cell includes a multi-level cell (MLC or 4LC) flash memory, a triple-level cell (TLC or 8LC) flash memory, a quad-level cell (QLC or 16LC) flash memory, a flash memory, a flash memory capable of storing data of five bits or more per memory cell, and the like. The MLC (or 4LC) flash memory is capable of storing data of two bits per memory cell. The TLC (or 8LC) flash memory is capable of storing data of three bits per memory cell. The QLC (or 16LC) flash memory is capable of storing data of four bits per memory cell. Although a flash memory that stores data of two or more bits per memory cell is sometimes referred to as an MLC flash memory, a flash memory that stores data of two bits per memory cell will be referred to as an MLC flash memory hereinafter.

The memory cell array of the NAND flash memory 5 includes a plurality of blocks BLK0 to BLKx−1. Each of the blocks BLK0 to BLKx−1 includes a plurality of pages P0 to Py–1. Each of the pages P0 to Py–1 includes a plurality of memory cells connected to the same word line. Each of the blocks BLK0 to BLKx–1 is a minimum unit of data erase operation for erasing data from the NAND flash memory 5. The blocks may be referred to as "erase blocks", "physical blocks" or "physical erase blocks". Each of the pages is a minimum unit of data write operation and data read operation. Note that the word line may be defined as a unit of data write operation and data read operation.

There is a limit to the maximum number of program/erase cycles allowed for each of blocks BLK0 to BLKx–1. One program/erase cycle of a block includes an erase operation for bringing all memory cells in the block into an erased state and a write operation, more specifically, a program operation, for writing data to each page of the block.

The controller 4 may be implemented by a circuit such as a system-on-a-chip (SoC). The controller 4 is electrically connected to the NAND flash memory 5 via a NAND interface (I/F) circuit 13. The NAND I/F circuit 13 is not limited to one in this embodiment, but based on a toggle NAND flash interface and an open NAND flash interface (ONFI). The NAND I/F circuit 13 is connected to each of a plurality of NAND flash memory chips in the NAND flash memory 5 via a plurality of channels (Ch). Since the NAND flash memory chips are driven in parallel, access to the NAND flash memory 5 can be broadened. The NAND I/F circuit 13 includes an ECC processor 18. Though an example in which the ECC processor 18 is provided in the NAND I/F circuit 13 will be described, it may be provided in the controller 4.

The ECC processor 18 can be implemented as a circuit having a function of protecting data written into the NAND flash memory 5 and data read from the NAND flash memory 5 using an error correction code (ECC). The ECC processor 18 adds an ECC to data written into the NAND flash memory 5. The ECC processor 18 also determines whether an error is included in data read from the NAND flash memory 5, using an ECC added to the read data. If an error is included, the ECC processor 18 corrects the error.

The controller 4 controls the NAND flash memory 5.

The controller 4 includes a host interface (I/F) circuit 11, a CPU 12, a DRAM interface (I/F) circuit 14, a direct memory access controller (DMAC) 15, and a static RAM (SRAM) 16 as well as the NAND I/F circuit 13. The host I/F circuit 11, CPU 12, NAND I/F circuit 13, DRAM I/F circuit 14, DMAC 15, and SRAM 16 are connected to each other via a bus 10.

The host I/F circuit 11 is configured to execute communications with the host 2. The host I/F circuit 11 is, for example, an SATA interface controller, an SAS interface controller, a PCIe controller, and an Ethernet controller.

The host I/F circuit 11 receives various commands from the host 2. ATA commands defined by the ATA standard are used in the SATA interface, SCSI commands defined by the SCSI standard are used in the SAS interface, and NVMe commands defined by the NVM Express (NVMe)™ standard are used in the PCIe and Ethernet interfaces.

The CPU 12 is configured to control the host interface 11, NAND I/F circuit 13, and DRAM interface 14. The CPU 12 executes a control program (firmware) stored in, e.g. a ROM (not shown) to execute various operations. The CPU 12 can function as a write controller 22 and a garbage collection (hereinafter referred to as GC)/compaction controller 26.

The SSD 3 includes a dynamic random access memory (DRAM 6) as a random access memory (RAM) that is a volatile memory. A random access memory such as a static random access memory (SRAM) may be built in the controller 4. Note that the DRAM 6 may be built in the controller 4.

The DRAM 6 includes a write buffer 32 for temporarily storing data to be written into the NAND flash memory 5.

The DRAM 6 also includes a cache area of a lookup table (L2P Table) 34 which functions as a logical-to-physical address conversion table. The logical address is an address used by the host 2 to specify a logical address in the logical address space of the SSD 3. As the logical address, a logical block address (LBA: Logical Block Address) can be used. The L2P table 34 manages mapping between each logical address (hereinafter referred to as LBA) and each physical address (PBA: Physical Block Address) of the NAND flash memory 5.

The controller 4 may function as a flash translation layer (FTL) configured to execute data management and block management of the NAND flash memory 5.

The data management executed by the FTL includes (1) management of mapping information indicating a correspondence between each LBA and each PBA of the NAND flash memory 5 and (2) an operation for hiding constraints of the NAND flash memory 5. The constraints include, for example, a read/write operation for each page and an erase operation for each block.

The controller 4 uses the L2P table 34 to manage mapping between each LBA and each PBA. The PBA corresponding to an LBA represents the latest physical storage location in the NAND flash memory 5 into which data corresponding to the LBA is written. The L2P table 34 may be loaded from the NAND flash memory 5 into the DRAM 6 when the SSD 3 is powered on.

In the NAND flash memory 5, data can be written into a page only once per erase cycle (program/erase cycle) of a block including the page. That is, new data cannot be overwritten directly on the area in a block into which data has already been written. In order to update data already written into a block, therefore, the controller 4 writes new data into an unwritten area in the block (or another block) and manages the previous data as invalid data. In other words, the controller 4 writes update data corresponding to an LBA into another physical storage location, not into a physical storage location in which the previous data corresponding to the LBA is stored. Then, the controller 4 updates the L2P table 34 to associate the LBA with a PBA indicating another physical storage location and invalidates the previous data.

The invalid data means data stored in a physical storage location which is not referred to from the L2P table 34. For example, data stored in a physical storage location which is not referred to from the L2P table 34, i.e. data that is not associated with the LBA as current data, is invalid data. The invalid data may no longer be read from the host 2. When update data is stored in a logical area associated with an LBA, the valid data stored so far in the logical area is invalidated, and the update data is validated.

The valid data means the latest data corresponding to an LBA. For example, data stored in a physical storage location that is referred to from the L2P table 34, that is, data associated with an LBA as current data, is valid data. The valid data may be read from the host 2 later.

The block management executed by the FTL includes defective block management, a wear leveling, and a GC operation.

The wear leveling makes the number of times of rewrite (the number of program/erase cycles) of each block uniform.

The GC operation decreases the number of blocks in which valid data and invalid data are mixed and increases the number of the free blocks. The free blocks do not contain valid data. The free blocks can be used as write destination blocks of new data after a data erase operation is executed. On the other hand, a block that stores valid data is an active block.

The NAND flash memory 5 can execute a write operation in a plurality of write modes that vary depending on how many bits of data are written per memory cell. The write modes include, for example, an SLC mode, an MLC mode, a TLC mode, a QLC mode, and a write mode in which data of five bits or more is written per memory cell. In the SLC mode, data of one bit is written per memory cell. In the MLC mode, data of two bits is written per memory cell. In the TLC mode, data of three bits is written per memory cell. In the QLC mode, data of four bits is written per memory cell.

For example, the NAND flash memory 5 may be implemented as an MLC flash memory (i.e. a 4LC flash memory) capable of storing data of two bits per memory cell.

In this case, usually, lower page data and upper page data, which are data for two pages, are written into a plurality of memory cells connected to the same word line. Thus, data of two bits can be written per memory cell. A freely selected area, e.g. one or more freely selected blocks, in the MLC flash memory can be used as an SLC area capable of storing data of only one bit per memory cell.

In the write operation of writing data into the SLC area, data for only one page is written into a plurality of memory cells connected to the same word line. Thus, in each block used as the SLC area, as in each block (i.e. SLC block) in the SLC flash memory, data of only one bit can be written per memory cell. As a result, each block used as the SLC area functions as an SLC block.

Alternatively, the NAND flash memory 5 may be a TLC flash memory (8LC flash memory) capable of storing data of three bits per memory cell.

In this case, usually, lower page data, middle page data, and upper page data, which are data for three pages, are written into a plurality of memory cells connected to the same word line. Thus, data of three bits can be written per memory cell. A freely selected area, e.g. one or more freely selected blocks, in the TLC flash memory can be used as the foregoing SLC area or an MLC area capable of storing data of two bits per memory cell. The SLC and MLC areas may be set in units smaller than blocks. For example, the SLC and MLC areas may be set in units of word lines or units of sets of word lines in a block. In the MLC area, data of only two pages is written into a plurality of memory cells connected to the same word line. Data of only two bits can thus be written into the MLC area per memory cell.

Alternatively, the NAND flash memory 5 may be a QLC flash memory (16LC flash memory) capable of storing data of four bits per memory cell.

In this case, usually, data for four pages is written into a plurality of memory cells connected to the same word line. Thus, data of four bits can be written per memory cell. A freely selected area (e.g. one or more freely selected blocks) in the QLC flash memory can be used as the foregoing SLC or MLC area, or a TLC area capable of storing data of three bits per memory cell. The SLC, MLC, and TLC areas may be set in units smaller than blocks. For example, the SLC, MLC, and TLC areas may be set in units of word lines or units of sets of word lines in a block. In the TLC area, data of only three pages is written into a plurality of memory cells connected to the same word line. Data of three bits can thus be written into the TLC area per memory cell.

The storage density per memory cell in each write mode is 2 values (i.e. one page per word line) in the SLC mode, 4 values (i.e. two pages per word line) in the MLC mode, 8 values (i.e. three pages per word line) in the TLC mode, and 16 values (i.e. four pages per word line) in the QLC mode. The higher the storage density, the lower the data write speed and read speed for the NAND flash memory 5. The lower the storage density, the higher the data write speed and read speed. In these four modes, therefore, the data write and read speed is the lowest in the QLC mode, and it is the highest in the SLC mode.

The higher the storage density, the shorter the life (or endurance) of the NAND flash memory 5. The lower the storage density, the longer the life. The lower the storage density, the wider a margin between threshold voltage distributions corresponding to adjacent states. The higher the storage density, the narrower the margin. The wide margin suppresses an increase in the probability that data of a memory cell will be read out as erroneous data even though the threshold voltage of the memory cell is shifted by stress to be applied to the memory cell.

Thus, for example, the degree of wear-out of each memory cell, which is allowable in the SLC mode, is higher than that of each memory cell which is allowable in the QLC mode. Therefore, when a low storage density write mode having a wide margin between threshold voltage distributions is used, the endurance of the NAND flash memory 5 can be made longer than when a high storage density write mode having a narrow margin between threshold voltage distributions is used. That is, the allowable maximum number of program/erase cycles can be increased when the low storage density write mode is used.

The endurance of the NAND flash memory 5 is the shortest in the QLC mode of the four modes, and the endurance is the longest in the SLC mode thereof. For example, the maximum number of program/erase cycles allowed when data is written in the QLC mode is several thousands of cycles, and the maximum number of program/erase cycles allowed when data is written in the SLC mode is several tens of thousands cycles.

Note that the NAND flash memory 5 may be configured to store data of five bits or more per memory cell. In this case, too, a freely selected area in the NAND flash memory 5 can be used as an area into which data of only four bits or less is written per memory cell.

An example of the storage capacity of the NAND flash memory 5 corresponding to each of the write modes will be described. Here, it is assumed that the NAND flash memory chips included in the NAND flash memory 5 are implemented as a QLC flash memory configured to store data of four bits per memory cell. It is also assumed that when data is written into the NAND flash memory 5 in the QLC mode, the storage capacity of the SSD 3 is 512 GB.

Under optimum conditions without defective blocks or the like, the storage capacity of the SSD3 is 384 GB when data is written into the NAND flash memory 5 in the TLC mode, it is 256 GB when data is written in the MLC mode, and it is 128 GB when data is written in the SLC mode.

As described above, the storage capacity of the NAND flash memory 5 varies depending on which write mode is used to write data.

In the first embodiment, as a write mode of the NAND flash memory 5, one of first and second write modes which differ in the number of data storable bits per memory cell can be selected. The first write mode is a performance-priority write mode for improving the write performance (and read performance) of the SSD3 in which the number of data storable bits per memory cell is small. The second write mode is a capacity-priority write mode for increasing the storage capacity in which the number of data storable bits per memory cell is large. The followings are examples of combinations of the first and second write modes when the NAND flash memory 5 has the SLC, MLC, TLC, and QLC modes as write modes.

In the first combination, the first write mode is the SLC mode and the second write mode is the MLC mode.

In the second combination, the first write mode is the SLC mode and the second write mode is the TLC mode.

In the third combination, the first write mode is the SLC mode and the second write mode is the QLC mode.

In the fourth combination, the first write mode is the MLC mode and the second write mode the TLC mode. In the fifth combination, the first write mode is the MLC mode and the second write mode is the QLC mode.

In the sixth combination, the first write mode is the TLC mode and the second write mode is the QLC mode.

In the following description, the first write mode (or performance-priority write mode) is the SLC mode and the second write mode (or capacity-priority write mode) is the TLC mode. Conventionally, an SSD determined which of the first and second write modes should be used. For example, when the SSD continues random access or receives a large amount of write data, it may select the performance-priority write mode to maintain the write speed. For example, the amount of use of free blocks by executing a write operation in the performance-priority write mode is larger than that in the capacity-priority write mode.

In a conventional storage system, the SSD 3 has selected the write mode of the NAND flash memory 5 based on a certain strategy. However, there is no guarantee that the selection result of the SSD 3 matches the desire of the host 2. Before the host 2 desires writing in the performance-priority write mode, the SSD 3 may execute a write operation in the performance-priority write mode and use free blocks of the NAND flash memory 5. In this case, the number of writable blocks is limited and thus the SSD 3 cannot select the performance-priority write mode when the host 2 desires writing in the performance-priority write mode, but it has to select the capacity-priority write mode.

In the first embodiment, the host 2 is configured to designate a write mode of the NAND flash memory 5, as will be described later.

The outline of the write operation of the NAND flash memory 5 will be described. As an example of the write mode, a case where the SLC mode is used as the performance-priority write mode and the TLC mode is used as the capacity-priority write mode, will be described. Each block of the NAND flash memory 5 can be used as both a TLC block and the SLC block.

Write data sent to the SSD 3 from the host 2 is stored temporarily in the write buffer 32. The write data read from the write buffer 32 is written into a write destination block of the NAND flash memory 5.

FIG. 2 shows an example of a write operation when the write mode of the NAND flash memory 5 is set to the SLC mode. When the write mode has been set to the SLC mode, write data is written into an SLC write destination block 102. The SLC write destination block 102 is the SLC block.

Figure 3:
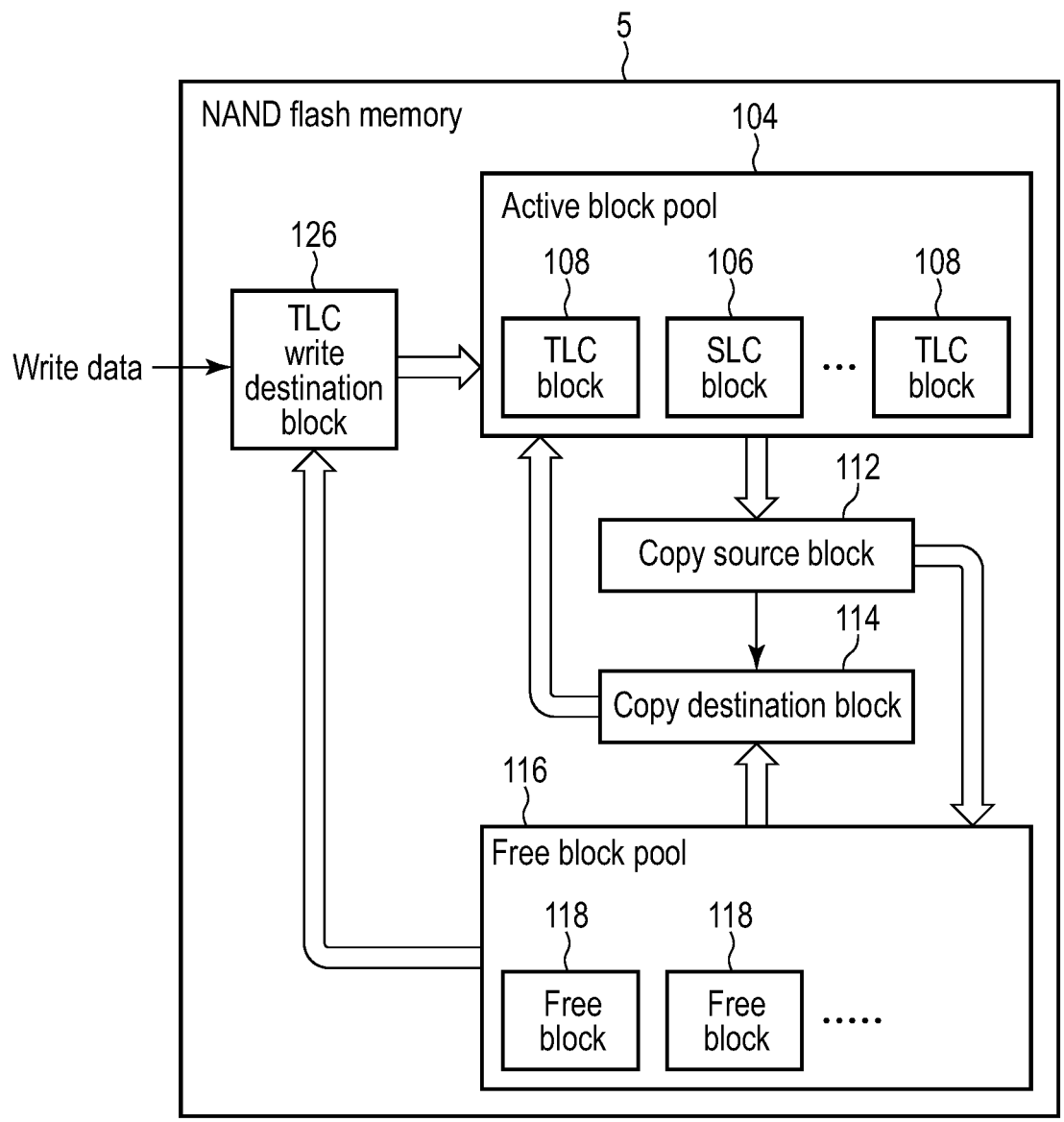
FIG. 3 is a block diagram showing another exemplary configuration of the NAND flash memory included in the storage device according to the first embodiment.

FIG. 3 shows an example of a write operation when the write mode of the NAND flash memory 5 is set to the TLC mode. When the write mode is set to the TLC mode, write data is written into a TLC write destination block 126. The TLC write destination block 126 is the TLC block.

As shown in FIGS. 2 and 3, the NAND flash memory 5 includes an active block pool 104 and a free block pool 116. The controller 4 allocates each block BLK of the NAND flash memory 5 to the active block pool 104 or the free block pool 116. The active block pool 104 includes one or more SLC blocks 106 and one or more TLC blocks 108. The free block pool 116 includes one or more free blocks 118.

The controller 4 executes a data erase operation for one of the free blocks 118 allocated to the free block pool 116, and then allocates the erased block to the SLC write destination block 102 or the TLC write destination block 126.

The controller 4 allocates the SLC write destination block 102 or the TLC write destination block 126 to the active block pool 104 when there is no space for writing new data in the SLC write destination block 102 or the TLC write destination block 126, that is, when the SLC write destination block 102 or the TLC write destination block 126 is filled with write data.

In order to increase the number of the free blocks allocated to the free block pool 116, a GC or a compaction is executed. In the GC/compaction, the controller 4 sets one of the SLC blocks 106 or one of the TLC blocks 108, which are allocated to the active block pool 104, as a copy source block 112. For example, the controller 4 may use a block having less valid data as a copy source block among active blocks in which valid data and invalid data are mixed. The controller 4 sets one of the free blocks 118 allocated to the free block pool 116 as a copy destination block 114.

The controller 4 copies the valid data of the copy source block 112 to the copy destination block 114. The controller 4 updates the L2P table 34 to map a PBA of the copy destination block 114 to each LBA of the valid data of the copied copy source block 112. When the valid data is copied to the copy destination block 114, the copy source block 112 includes only invalid data and is allocated to the free blocks.

Since each block can be used as both the TLC block or the SLC block, a block allocated to the SLC write destination block 102 need not be fixed to a specific one. The copy source block of the GC/compaction for generating a free block to be allocated to the SLC write destination block 102 is not limited to the SLC block, but may be the TLC block. Since the SLC block stores only 33% of the data stored in the TLC block, the amount of data to be copied is small, with the result that there is a strong possibility that the SLC block will be selected as a copy source block. If, however, the ratio of invalid data in the TLC block is high and that of valid data therein is low, the TLC block may be selected as a copy source block. For example, a block BLK0 may be allocated to the SLC write destination block 102, and set to the SLC active block 106 and then changed to the free block 118 by the GC/compaction, and then allocated to the TLC write destination block 126. This is referred to as an SLC/TLC selecting system. In the SLC/TLC selecting system, the free block pool 116 can be used as the SLC block and the TLC block.

In contrast to the above, there is a system in which a block to be allocated to the SLC write destination block 102 is determined to be a specific block, such as blocks BLK0 to BLK99. This system will be referred to as an SLC fixing system. In the SLC fixing system, a free block pool for the SLC write destination block and a free block pool for the TLC write destination block need to be separated from each other. The GC/compaction for making a free block for the SLC write destination block 102 and the GC/compaction for making a free block for the TLC write destination block 126 are different operations.

The first embodiment is applicable to both the SLC/TLC selecting system and the SLC fixing system.

The operation of selecting the SLC block as the copy source block 112 and rewriting data of the SLC buffer into the TLC block by the GC operation may be referred to as a compaction operation. In this specification, however, an operation of copying valid data of the copy source block 112 that is an active block to the copy destination block and generating a free block by setting the copy source block as the free block, is generally referred to as the GC/compaction.

In the NAND flash memory 5, a set of blocks used as the SLC block will be referred to as the SLC buffer. The SLC buffer includes a block which is originally the TLC block and into which data is temporarily written in the SLC mode. The data written into the SLC block in the SLC buffer is rewritten to the TLC block in the TLC mode by the GC/compaction.

Figure 4B:
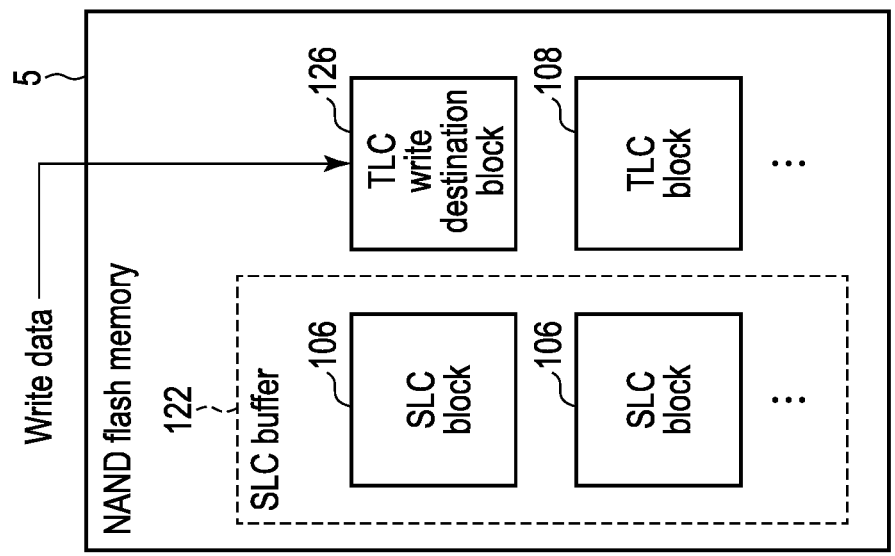
FIG. 4B is a block diagram showing another exemplary configuration of the SLC buffer included in the NAND flash memory included in the storage device according to the first embodiment.
Figure 4A:
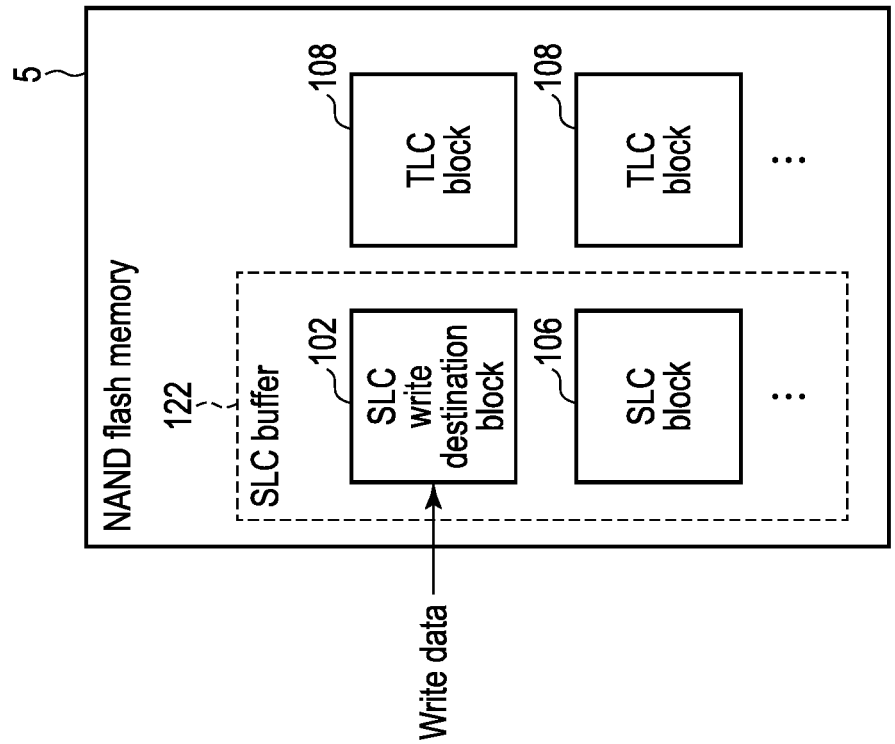
FIG. 4A is a block diagram showing an exemplary configuration of an SLC buffer included in the NAND flash memory included in the storage device according to the first embodiment.

FIGS. 4A and 4B are block diagrams illustrating the concept of the SLC buffer. FIG. 4A shows an example of the SLC buffer 122 when the write mode of the NAND flash memory 5 is set to the SLC mode. In this example, the SLC buffer 122 includes the SLC write destination block 102, which is a write destination block of write data, and the SLC block 106 into which write data has already been written. The blocks other than the SLC buffer 122 of the NAND flash memory 5 include TLC blocks 108.

FIG. 4B shows an example of the SLC buffer 122 when the write mode of the NAND flash memory 5 is set to the TLC mode. In this example, the SLC buffer 122 includes the SLC blocks 106 to which write data has already been written. The blocks other than the SLC buffer 122 of the NAND flash memory 5 includes the TLC block 108 and a TLC write destination block 126.

As described above, since the storage capacity of the SLC blocks 102 and 106 is ⅓ of the storage capacity of the TLC blocks 126 and 108, the storage capacity of the SSD 3 decreases as the number of blocks of the SLC buffer 122 increases. In order to prevent the storage capacity of the SSD 3 from being equal to or smaller than a predetermined capacity, an upper limit can be set for the number of blocks of the SLC buffer 122.

Figure 5:
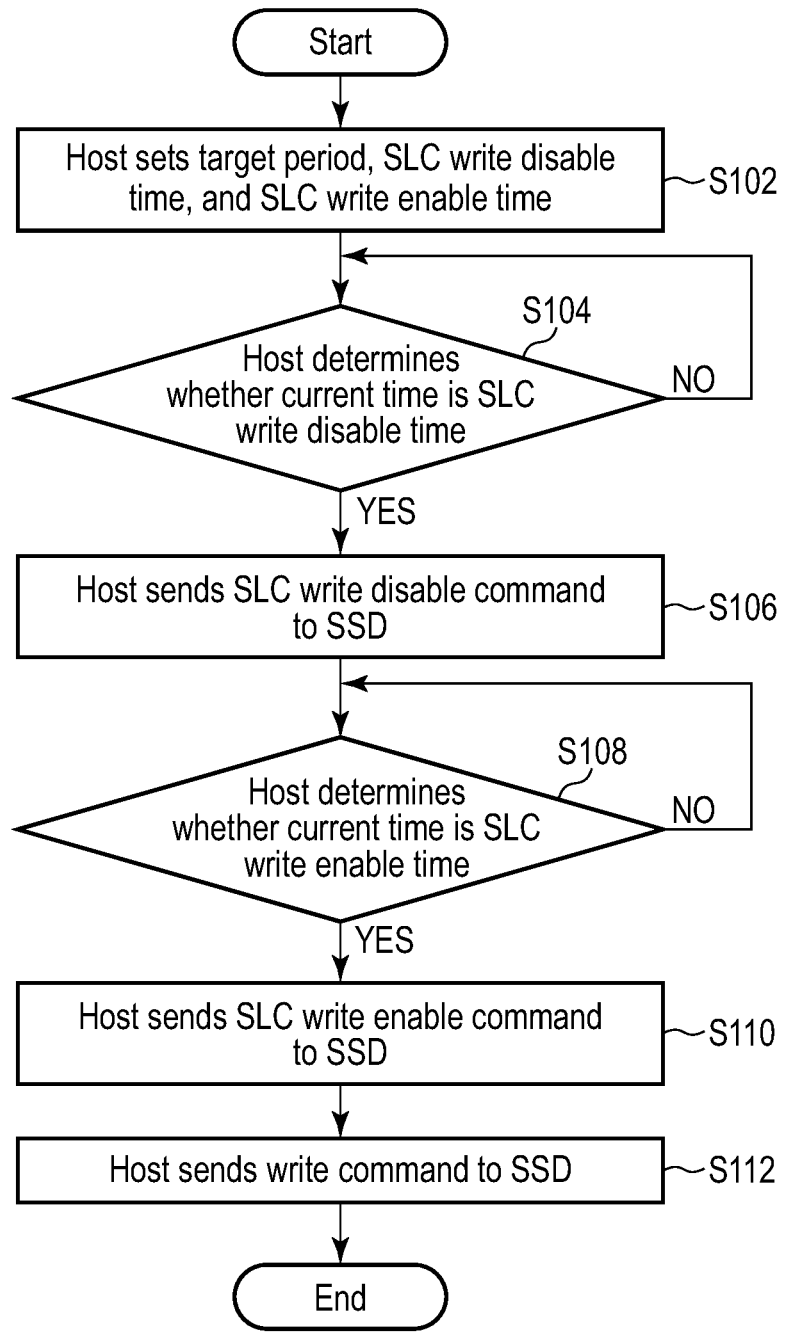
FIG. 5 is a flowchart showing an example of a write operation of a host of the storage system according to the first embodiment.
Figure 6:
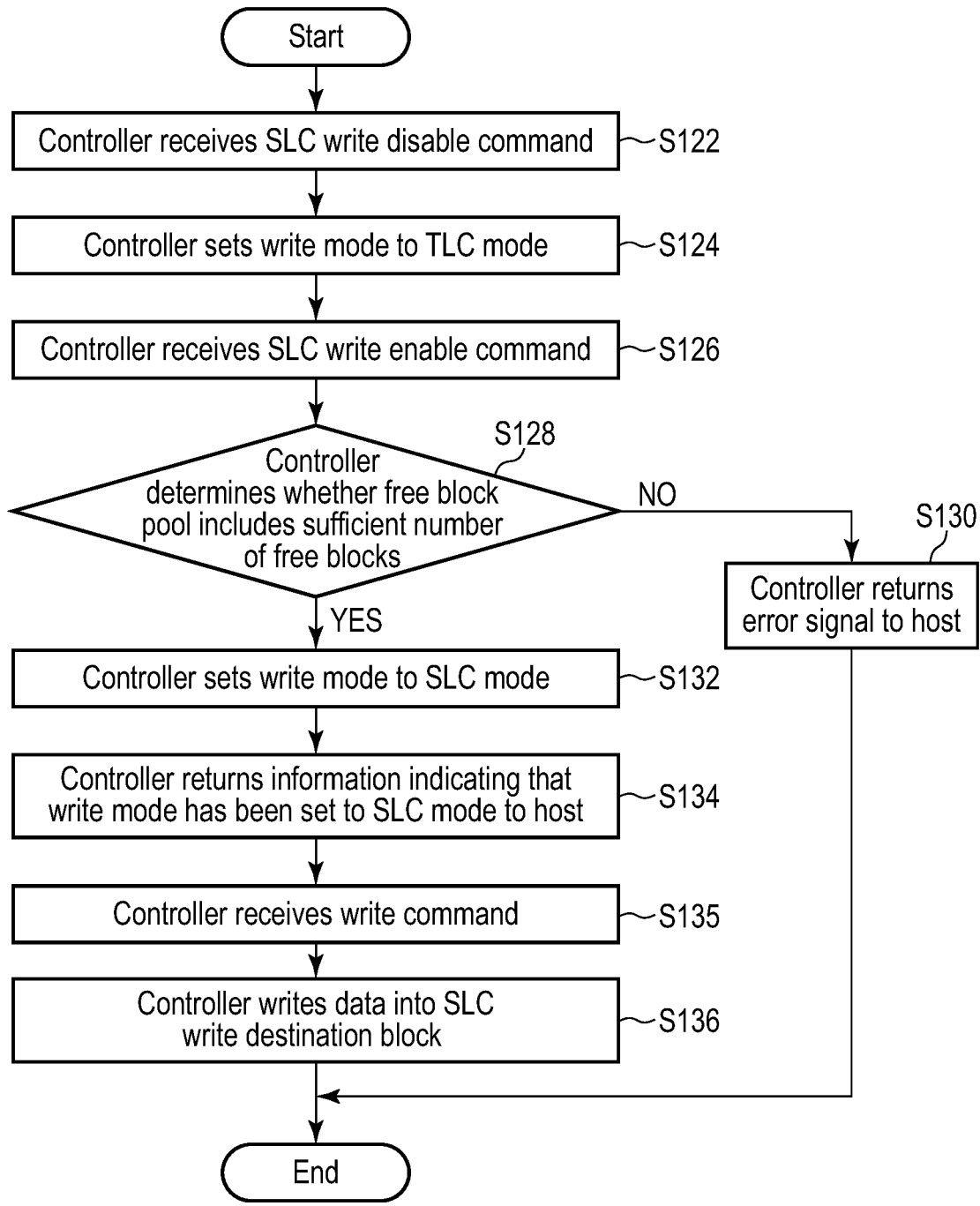
FIG. 6 is a flowchart showing an example of a write operation of the storage device of the storage system according to the first embodiment.

FIG. 5 is a flowchart showing an example of the write operation of the host 2 in the storage system 1 according to the first embodiment. FIG. 6 is a flowchart showing an example of the write operation of the SSD 3 in the storage system 1 according to the first embodiment.

As shown in FIG. 5, the host 2 sets a target period during which the host 2 desires high write performance, an SLC write disable time, and an SLC write enable time in S102. An operating system (OS) of the host 2 that drives an SSD driver (NVMe driver, SATA drivers, etc.) or an application program of the host 2 can determine the target period. The user or operator of the host 2 may decide the target period and input it to the host 2. Then, the host 2 sets the start of the target period or a time immediately before the target period as the SLC write enable time. The host 2 sets any time before the SLC write enable time as the SLC write disable time.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the SLC write disable command to the SSD 3 in S106. The host 2 may send the write command to the SSD 3 after S106 if there is data to be written.

After S106, the host 2 determines in S108 whether a current time is the SLC write enable time. If the host 2 determines that the current time is not the SLC write enable time (NO in S108), the host 2 repeats the determination in S108 until the SLC write enable time.

If the host 2 determines that the current time is the SLC write enable time (YES in S108), the host 2 sends an SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

In the SSD 3, as shown in FIG. 6, upon receiving the SLC write disable command from the host 2 in S122, the controller 4 sets the write mode to the TLC mode in S124. After that, upon receiving the write data from the host 2, the controller 4 writes the data into the TLC write destination block 126 of the NAND flash memory 5, as shown in FIG. 3.

Upon receiving the SLC write enable command from the host 2 in S126, the controller 4 determines in S128 whether the free block pool 116 includes a sufficient number of the free blocks 118. Specifically, the controller 4 determines whether the number of the free flocks exceeds a predetermined number. This number relates to the conditions under which a write operation can be executed in the SLC mode, and may be ten, for example. If the number of the free blocks 118 in the free block pool 116 is larger than ten, a write operation can be executed in the SLC mode. If the number is ten or smaller, the write operation cannot be executed in the SLC mode.

If the controller 4 determines that the free block pool 116 does not include a sufficient number of the free blocks (NO in S128), the controller 4 returns an error signal to the host 2 in S130. After S130, the controller 4 ends the operation.

If the controller 4 determines that the free block pool 116 includes a sufficient number of the free blocks (YES in S128), the controller 4 sets the write mode of the write data to the SLC mode in S132. The controller 4 returns information indicating that the write mode has been set to the SLC mode to the host 2 in S134.

Upon receiving the write command from the host 2 in S135, the controller 4 writes the data into the SLC write destination block 102 of the NAND flash memory 5 in S136, as shown in FIG. 2. After S136, the controller 4 ends the operation. If the controller 4 receives no write command from the host 2, the controller 4 does not execute the operations in S135 and S136.

Although not shown in the flowchart, when the number of the free blocks becomes equal to or smaller than a predetermined number, the controller 4 may change the write mode of the write data to the TLC mode regardless of a mode control instruction from the host 2. When the number of the free blocks increases, the controller 4 may change the write mode of the write data to the SLC mode if the SLC write is enabled.

FIG. 5 shows an example in which the host 2 sends one set of the SLC write disable command and the SLC write enable command to the SSD 3. When there are a plurality of target periods, the host 2 may send two or more sets of the SLC write disable command and the SLC write enable command to the SSD 3.

Figure 7B:
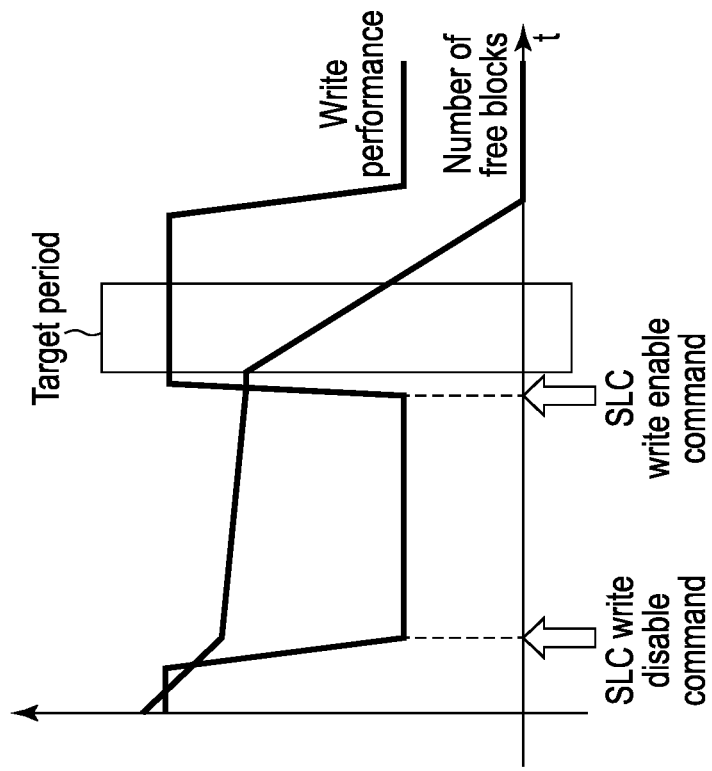
FIG. 7B is a graph showing an example of changes in the number of the free blocks and the write performance in the first embodiment.
Figure 7A:
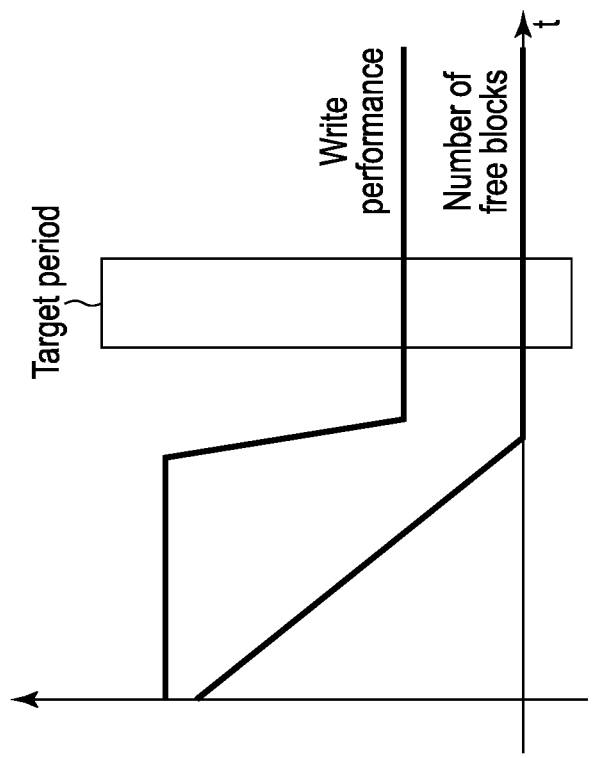
FIG. 7A is a graph showing an example of changes in the number of free blocks and a write performance in a comparative example where an SSD sets a write mode.

With reference to FIGS. 7A and 7B, it will be described an example of changes in the number of the free blocks and the write performance. FIG. 7A is a graph showing an example of changes in the number of the free blocks and the write performance in a comparative example where the SSD 3 sets a write mode. Assume that the SSD 3 first selects the SLC mode as a write mode. At first, the write performance is high, but the number of the free blocks decreases. As the write operation proceeds, the number of the free blocks decreases. When the number of the free blocks becomes equal to or smaller than a predetermined number, the write operation cannot be executed in the SLC mode, with the result that the write mode is changed to the TLC mode, and the write performance is lowered. Therefore, even though the host 2 then desires a write operation in the SLC mode, the write operation in the SLC mode is not executed when the host desires the write operation.

FIG. 7B is a graph showing an example of changes in the number of the free blocks and the write performance in the first embodiment. If the SSD 3 receives no instruction from the host 2, the SSD 3 selects the SLC mode as a write mode. As in the comparative example, the write performance is first high, but the number of the free blocks suddenly decreases. The host 2 sends the SLC write disable command to the SSD 3 at a certain point in time. After this point in time, the write mode is set to the TLC mode. Thus, the write performance lowers, but the number of the free blocks decreases gradually. The host 2 sends the SLC write enable command to the SSD 3 at the start of the target period or a time immediately before the target period. Since the SSD 3 sets the write mode to the SLC mode upon receiving the SLC write enable command, the SSD 3 can execute the write operation in the SLC mode in the target period.

Figure 8:
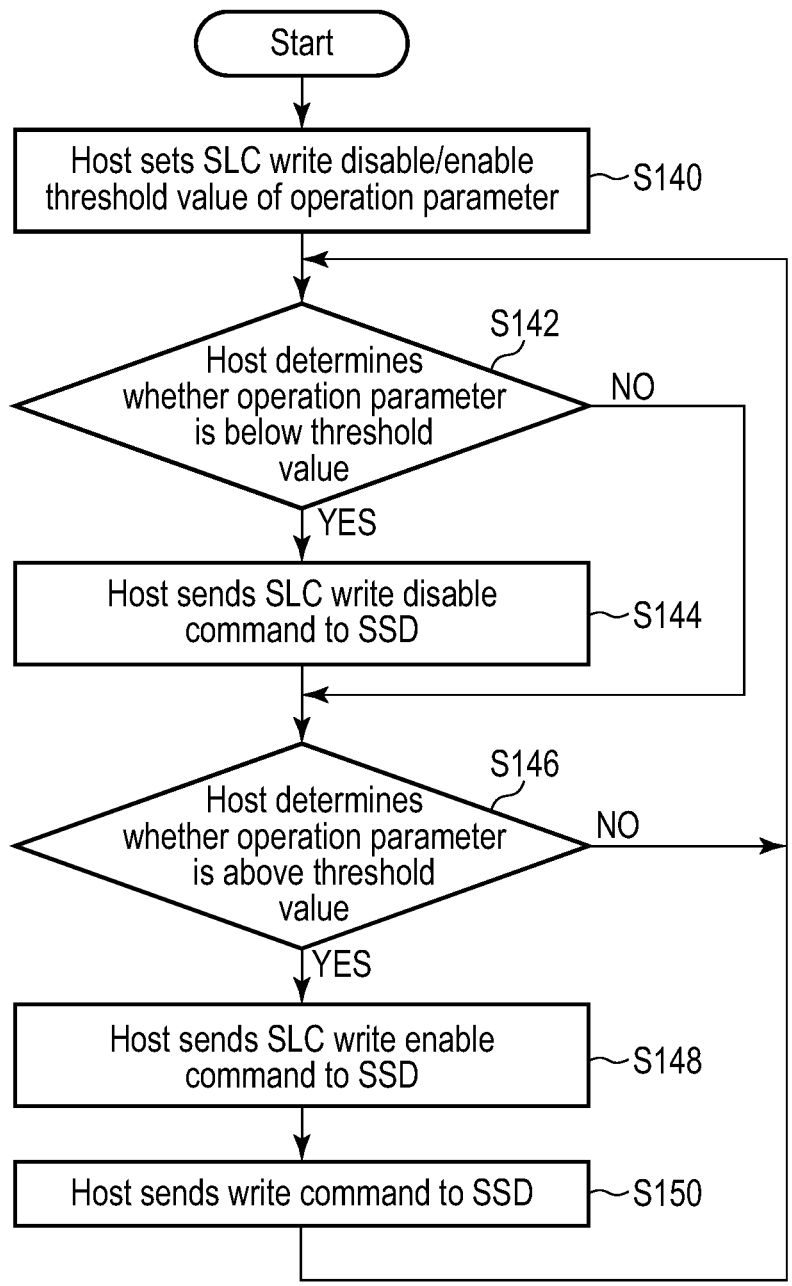
FIG. 8 is a flowchart showing another example of the write operation of the host of the storage system according to the first embodiment.

FIG. 8 is a flowchart showing another example of the write operation of the host 2 in the storage system 1 according to the first embodiment. In the example shown in FIG. 5, the host 2 sets the SLC write disable time and the SLC write enable time in advance, and sends the SLC disable command and the SLC enable command to the SSD 3 at corresponding times. As shown in FIG. 8, however, the host 2 may not decide the times in advance.

In S140, the host 2 sets the SLC write disable/enable threshold value of an operation parameter. For example, 60% of the use rate of the CPU included in the host 2 may be used as the threshold value of the operation parameter. Since the host 2 can determine that the load of an application is high when the use rate exceeds 60%, the host 2 may enable the SLC write and increase the data write speed to improve the user experience. When the use rate falls below 60%, the host 2 may disable the SLC write and decrease the speed of the write.

In S142, the host 2 determines whether the operation parameter is below the threshold value, i.e. the use rate is 60% or less. If the host 2 determines that the use rate is below the threshold value (YES in S142), the host sends the SLC write disable command to the SSD 3 in S144. After S144, the host 2 may send the write command to the SSD 3 if there is data to be written.

After S144 or when the host 2 determines in S142 that the use rate is not below the threshold value (NO in S142), the host 2 determines in S146 whether the operation parameter is above the threshold value, i.e. the use rate is higher than 60%. If the host 2 determines that the use rate is above the threshold value (YES in S146), the host 2 sends the SLC write enable command to the SSD 3 in S148. The host 2 sends the write command to the SSD 3 in S150. Note that the operation in S150 is executed when there is data to be written. Thus, the host 2 may execute the operation in S150 a plurality of times or may not execute the operation at all.

If the host 2 determines in S146 that the use rate is not above the threshold value (NO in S146), the host 2 executes the operation in S142 again.

As described above, the host 2 determines whether it is the SLC write disable/enable time based on the operation of the host 2 at any time, and sends the SLC write disable/enable command to the SSD 3 based on a result of the determination. The host 2 can set the write mode of the SSD 3 to the SLC write mode at a desired timing.

Upon receiving the SLC write command from the host 2, the SSD 3 determines a type of the command (SLC write disable command or SLC write enable command) and executes the same operation as shown in FIG. 6.

As has been described above, according to the first embodiment, the write operation can be executed in the SLC mode during the target period.

Other embodiments will be described. In the descriptions of the other embodiments, the same components as those of the first embodiment will be denoted by the same reference numerals and their detailed descriptions will be omitted. The same drawings as those of the first embodiment are not shown.

Second Embodiment

In the first embodiment, upon receiving the SLC write enable command, the SSD 3 executes the write operation in the SLC mode until it receives the SLC write disable command. In the second embodiment, the execution of write operation in the SLC mode is restricted. More specifically, in the second embodiment, the host 2 sets a target size of data to be written by a write operation in the SLC mode (hereinafter referred to as an SLC writable size) and stops the write operation in the SLC mode if the size of data written in the SLC mode (hereinafter referred to as an SLC write data size) exceeds the SLC writable size.

Figure 9:
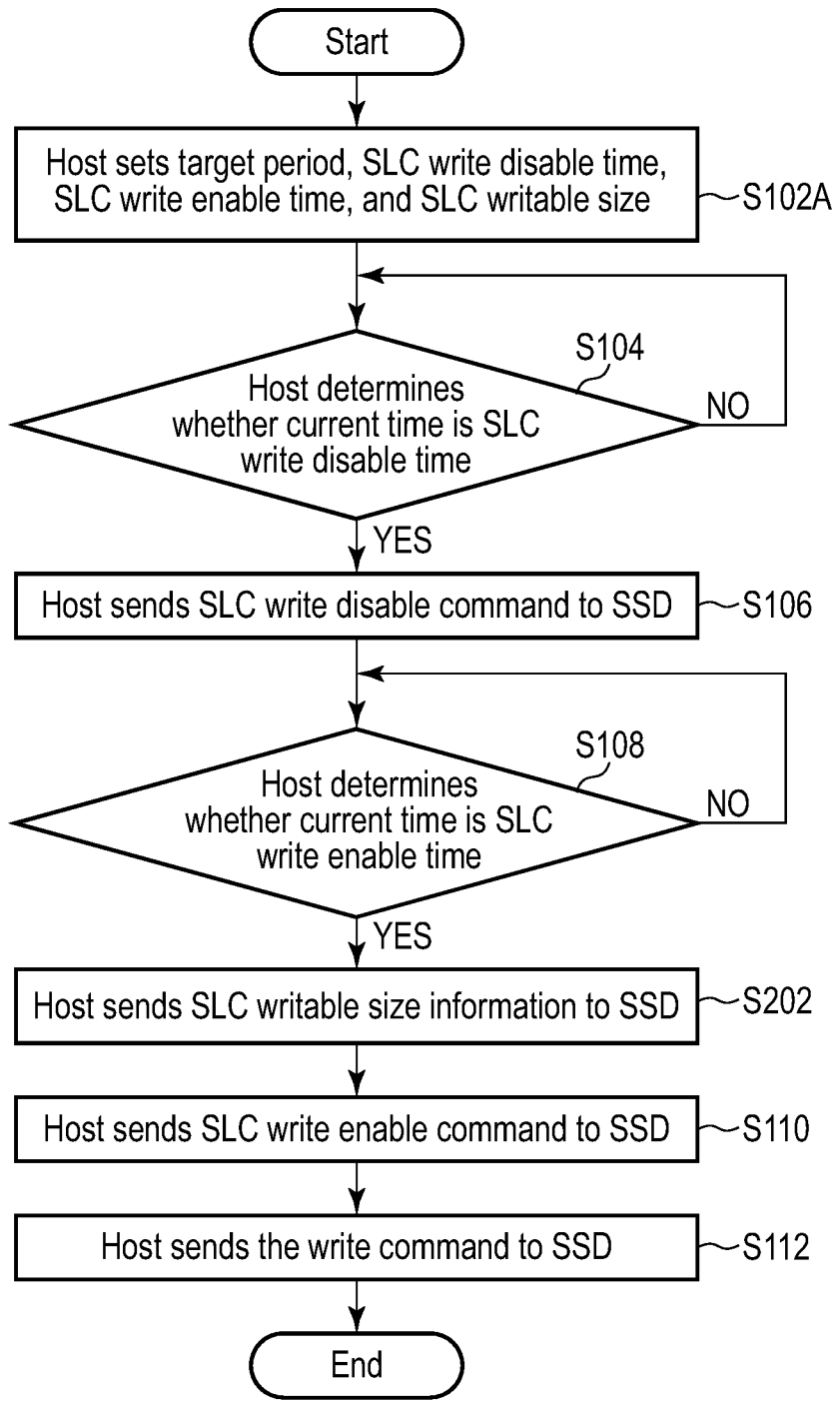
FIG. 9 is a flowchart showing an example of a write operation of a host of a storage system according to a second embodiment.
Figure 10:
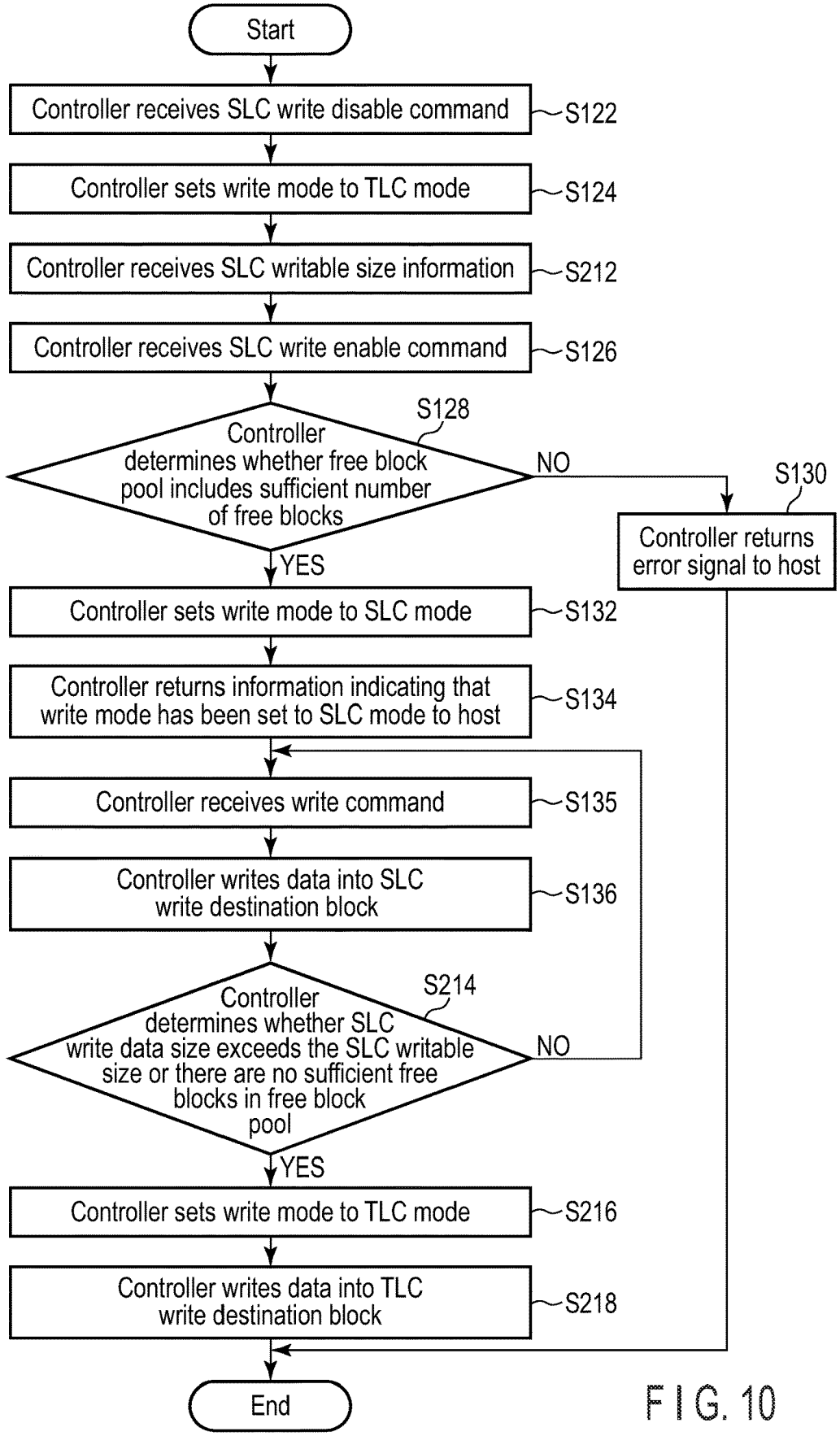
FIG. 10 is a flowchart showing an example of a write operation of the storage device of the storage system according to the second embodiment.

FIG. 9 is a flowchart showing an example of the write operation of the host 2 in the storage system 1 according to the second embodiment. FIG. 10 is a flowchart showing an example of the write operation of the SSD 3 in the storage system 1 according to the second embodiment.

As shown in FIG. 9, the host 2 sets the target period, the SLC write disable time, the SLC write enable time, and the SLC writable size in S102A.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the SLC write disable command to the SSD 3 in S106. The host 2 may send the write command to the SSD 3 after S106.

After S106, the host 2 determines in S108 whether a current time is the SLC write enable time. If it is not the SLC write enable time (NO in S108), the host 2 repeats the determination in S108 until the SLC write enable time.

If the host 2 determines that the current time is the SLC write enable time (YES in S108), the host 2 sends an SLC writable size information to the SSD 3 in S202. The host 2 may send the SLC writable size information as an SLC writable size designation command. Since the host 2 manages a size of data to be written in the SLC mode, the host 2 can determine an SLC writable size in accordance with the size of data.

After S202, the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

Note that the order of sending the SLC writable size designation command and the SLC write enable command may be reversed. Instead of sending the SLC writable size designation command and the SLC write enable command separately, they can be sent simultaneously. For example, the SLC writable size may be included in the parameter of the SLC write enable command.

In the SSD 3, as shown in FIG. 10, upon receiving the SLC write disable command from the host 2 in S122, the controller 4 sets the write mode to the TLC mode in S124. The controller 4 receives the SLC writable size information from the host 2 in S212. Upon receiving the SLC write enable command from the host 2 in S126, the controller 4 determines in S128 whether the free block pool 116 includes a sufficient number of the free blocks 118.

When the host 2 changes a method of sending the SLC writable size designation command and the SLC write enable command (e.g. simultaneous sending or separate sending, and the order of sending in the case of separate sending) from the example shown in FIG. 9, the SSD 3 changes a method of receiving the SLC writable size designation command and the SLC write enable command in accordance with the change of the sending method.

If the controller 4 determines that the free block pool 116 does not include a sufficient number of the free blocks (NO in S128), the controller 4 returns an error signal to the host 2 in S130. After S130, the controller 4 ends the operation.

If the controller 4 determines that the free block pool 116 includes a sufficient number of the free blocks (YES in S128), the controller 4 sets the write mode of the write data to the SLC mode in S132. The controller 4 returns information indicating that the write mode has been set to the SLC mode to the host 2 in S134.

Upon receiving the write command from the host 2 in S135, the controller 4 writes the data into the SLC write destination block 102 of the NAND flash memory 5 in S136, as shown in FIG. 2. If the controller 4 receives no write command from the host 2, the controller 4 does not execute the operations in S135 and S136.

The controller 4 determines in S214 whether the SLC write data size exceeds the SLC writable size or whether there are no sufficient free blocks in the free block pool 116. If the controller 4 determines that the SLC write data size does not exceed the SLC writable size and there are a sufficient number of the free blocks in the free block pool 116 (NO in S214), the controller 4 continues the operations in S135, S136, and S214.

If the controller 4 determines that the SLC write data size exceeds the SLC writable size or there are no sufficient free blocks in the free block pool 116 (YES in S214), the controller 4 sets the write mode to the TLC mode in S216 even if the controller 4 does not receive a mode set command from the host 2. As shown in FIG. 3, the controller 4 writes the data into the TLC write destination block 126 of the NAND flash memory 5 in S218 and ends the operation.

FIG. 11A is a graph showing an example of changes in the number of the free blocks and the write performance in a comparative example where the SSD 3 sets a write mode. FIG. 11A corresponds to FIG. 7A.

FIG. 11B is a graph showing an example of changes in the number of the free blocks and the write performance in the second embodiment. As in the first embodiment, the write performance is improved during the period desired by a user. In addition, according to the second embodiment, when the SLC write data size exceeds the SLC writable size or when there are no sufficient free blocks in the free block pool 116, the host 2 stops the write operation in the SLC mode and then executes the write operation in the TLC mode. After that, the write performance is deteriorated, but the number of the free blocks decreases gradually. FIG. 11B shows an example where the host 2 stops the write operation in the SLC mode because the SLC write data size exceeds the SLC writable size.

Third Embodiment

Like the second embodiment, the third embodiment relates to restrictions on the execution of the write operation in the SLC mode. In the third embodiment, the host 2 sets a target period during which the host 2 desires to a write operation in the SLC mode (hereinafter referred to as SLC writable time). The host 2 stops the write operation in the SLC mode when a time for writing the data in the SLC mode (hereinafter referred to as SLC data write time) exceeds the SLC writable time.

Figure 12:
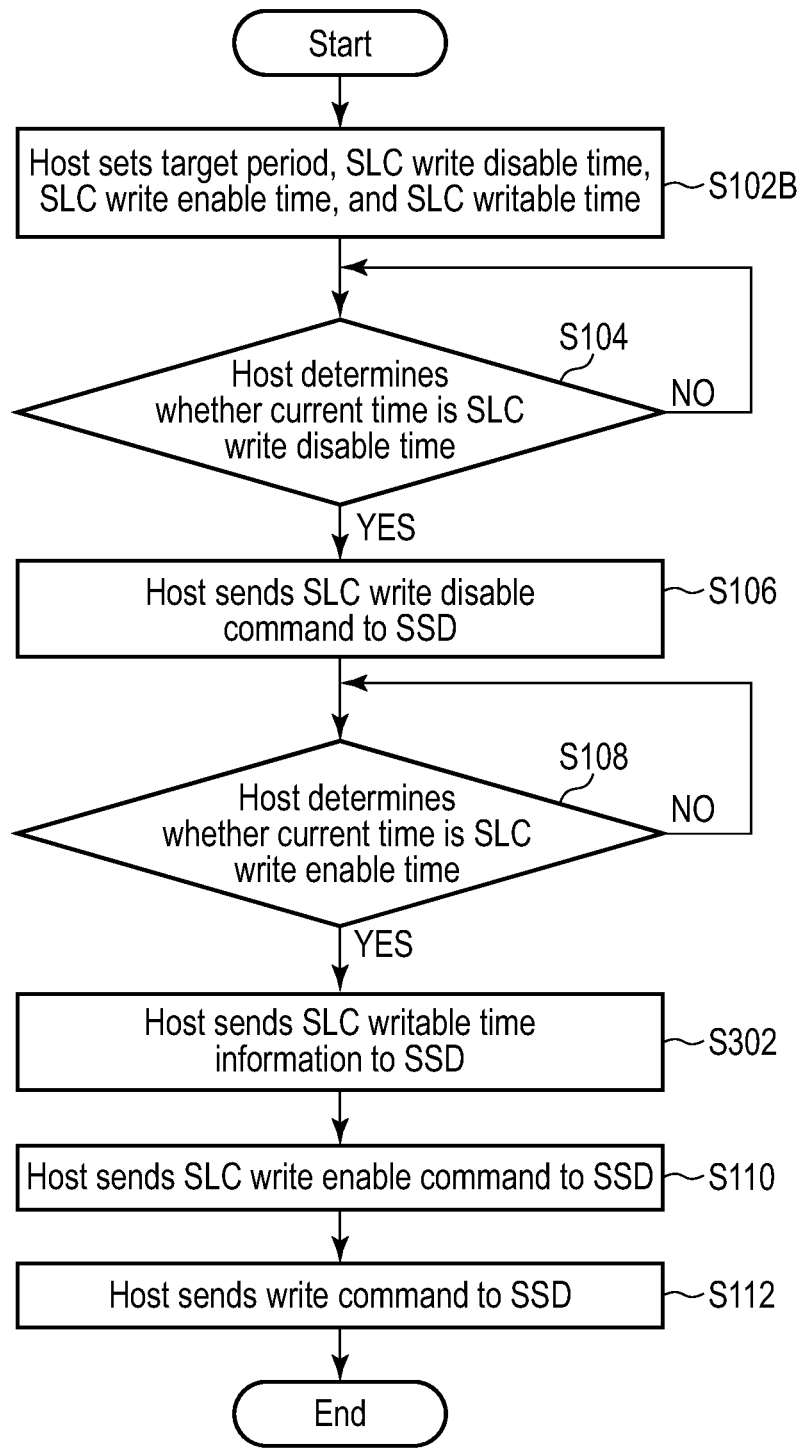
FIG. 12 is a flowchart showing an example of a write operation of a host of a storage system according to a third embodiment.
Figure 13:
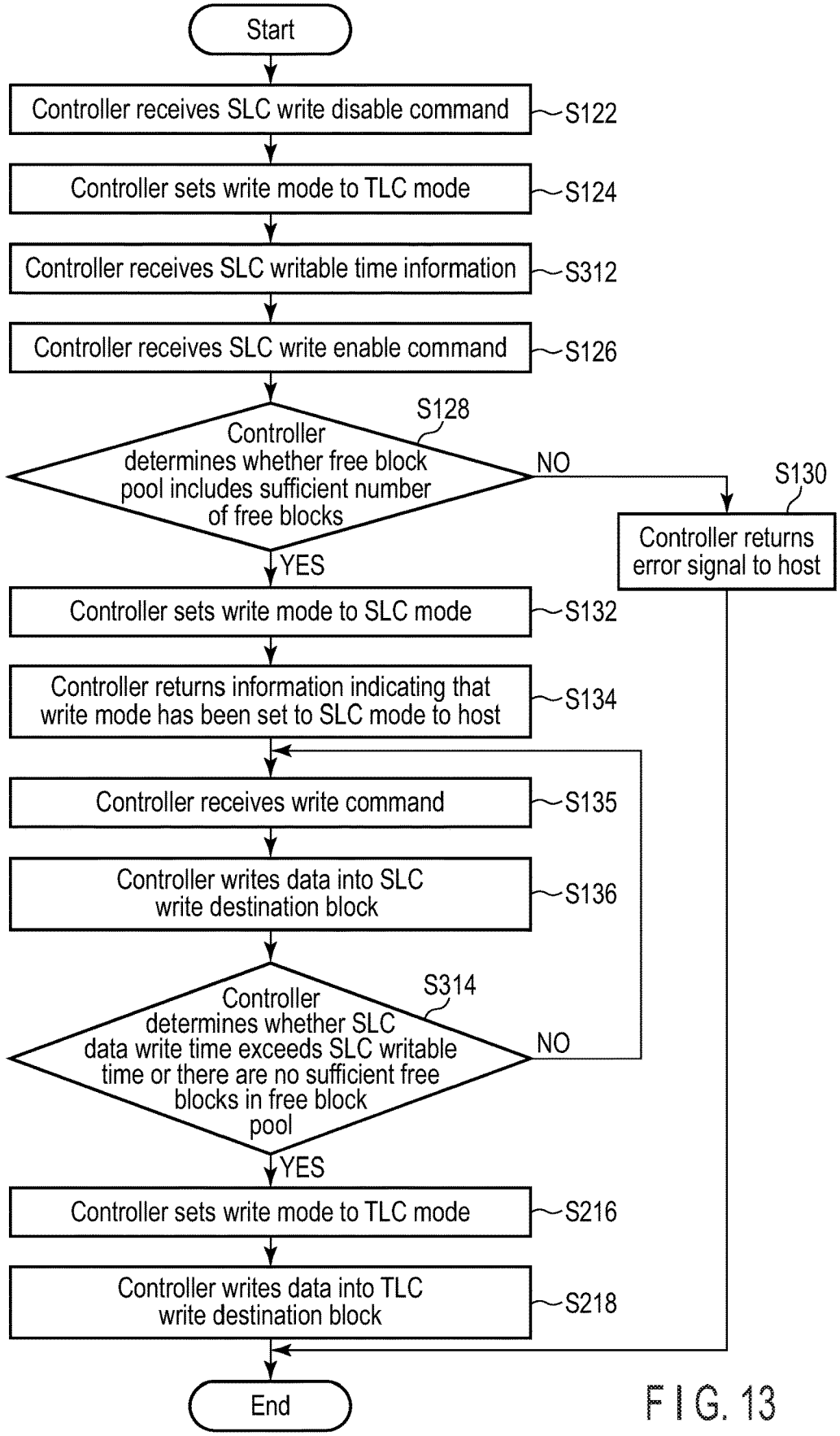
FIG. 13 is a flowchart showing an example of a write operation of the storage device of the storage system according to the third embodiment.

FIG. 12 is a flowchart showing an example of the write operation of the host 2 in the storage system 1 according to the third embodiment. FIG. 13 is a flowchart showing an example of the write operation of the SSD 3 in the storage system 1 according to the third embodiment.

As shown in FIG. 12, the host 2 sets the target period, the SLC write disable time, the SLC write enable time, and the SLC writable time in S102B.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the SLC write disable command to the SSD 3 in S106. The host 2 may send the write command to the SSD 3 after S106 if there is data to be written.

After S106, the host 2 determines in S108 whether a current time is the SLC write enable time. If it is not the SLC write enable time (NO in S108), the host 2 repeats the determination in S108 until the SLC write enable time.

If the host 2 determines that the current time is the SLC write enable time (YES in S108), the host 2 sends the SLC writable time information to the SSD 3 in S302. The host 2 may send the SLC writable time information as the SLC writable time designation command. Since the host 2 manages for what seconds data is to be written in the SLC mode, the host 2 can determine the SLC writable time in accordance with the number of seconds.

After S302, the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

Note that the order of sending the SLC writable time designation command and the SLC write enable command may be reversed. Instead of sending the SLC writable time designation command and the SLC write enable command separately, they can be sent simultaneously. For example, the SLC writable time information may be included in the parameter of the SLC write enable command.

In the SSD 3, as shown in FIG. 13, upon receiving the SLC write disable command from the host 2 in S122, the controller 4 sets the write mode to the TLC mode in S124. Upon receiving the write data from the host 2, the controller 4 writes the data into the TLC write destination block 126 of the NAND flash memory 5 as shown in FIG. 3. After that, the controller 4 receives the SLC writable time information from the host 2 in S312. Upon receiving the SLC write enable command from the host 2 in S126, the controller 4 determines in S128 whether the free block pool 116 includes a sufficient number of the free blocks 118.

When the host 2 changes a method of sending the SLC writable time designation command and the SLC write enable command from the example shown in FIG. 12, the SSD 3 changes a method of receiving the SLC writable time designation information and the SLC write enable command in accordance with the change of the sending method.

If the controller 4 determines that the free block pool 116 does not include a sufficient number of the free blocks (NO in S128), the controller 4 returns an error signal to the host 2 in S130. After S130, the controller 4 ends the operation.

If the controller 4 determines that the free block pool 116 includes a sufficient number of the free blocks (YES in S128), the controller 4 sets the write mode of the write data to the SLC mode in S132 even if the controller 4 does not receive a mode set command from the host 2. The controller 4 returns information indicating that the write mode has been set to the SLC mode to the host in S134.

Upon receiving the write command from the host 2 in S135, the controller 4 writes the data into the SLC write destination block 102 of the NAND flash memory 5 in S136, as shown in FIG. 2. If the controller 4 receives no write command from the host 2, the controller 4 does not execute the operations in S135 and S136.

The controller 4 determines in S314 whether the SLC data write time exceeds the SLC writable time or whether there are no sufficient free blocks in the free block pool 116. If the controller 4 determines that the SLC data write time does not exceed the SLC writable time and there are a sufficient number of the free blocks in the free block pool 116 (NO in S314), the controller 4 continues the operations in S135, S136, and S314.

If the controller 4 determines that the SLC data write time exceeds the SLC writable time or there are no sufficient free blocks in the free block pool 116 (YES in S314), the controller 4 sets the write mode to the TLC mode in S216. The controller 4, as shown in FIG. 3, writes the data into the TLC write destination block 126 of the NAND flash memory 5 in S218 and ends the operation.

According to the third embodiment, when the SLC data write time exceeds the SLC writable time or when there are no sufficient free blocks in the free block pool 116, the host 2 stops the write operation in the SLC mode and then executes the write operation in the TLC mode. In the second embodiment, the host 2 stops the write operation in the SLC mode based on the SLC write data size instead of the SLC data write time. The foregoing example of changes in the number of the free blocks and the write performance in the third embodiment is not shown because it is the same as the example of changes in the second embodiment shown in FIGS. 11A and 11B. The second and third embodiments are different from each other in a criterion of determining a time when the write performance lowers, but the SLC write data size and the SLC data write time are related to each other. Therefore, the second and third embodiments bring about substantially the same advantages.

The operation of the host 2 in each of the second and third embodiments is based on the operation of the host 2 in the first embodiment shown in FIG. 5, but may be based on the operation of the host 2 in the modification to the first embodiment shown in FIG. 8. In the latter case, S202 of sending the SLC writable size to the SSD 3 (FIG. 9) or S302 of sending the SLC writable time to the SSD 3 (FIG. 12) is executed immediately before S148 of sending the SLC write enable command to the SSD 3 (FIG. 8).

Fourth Embodiment

The second and third embodiments relate to restrictions on the execution of the write operation when the SLC write is enabled. Next is a description of a fourth embodiment in which the GC/compaction is executed when the SLC write is disabled to generate the free blocks and recover the number of the free blocks.

Figure 14:
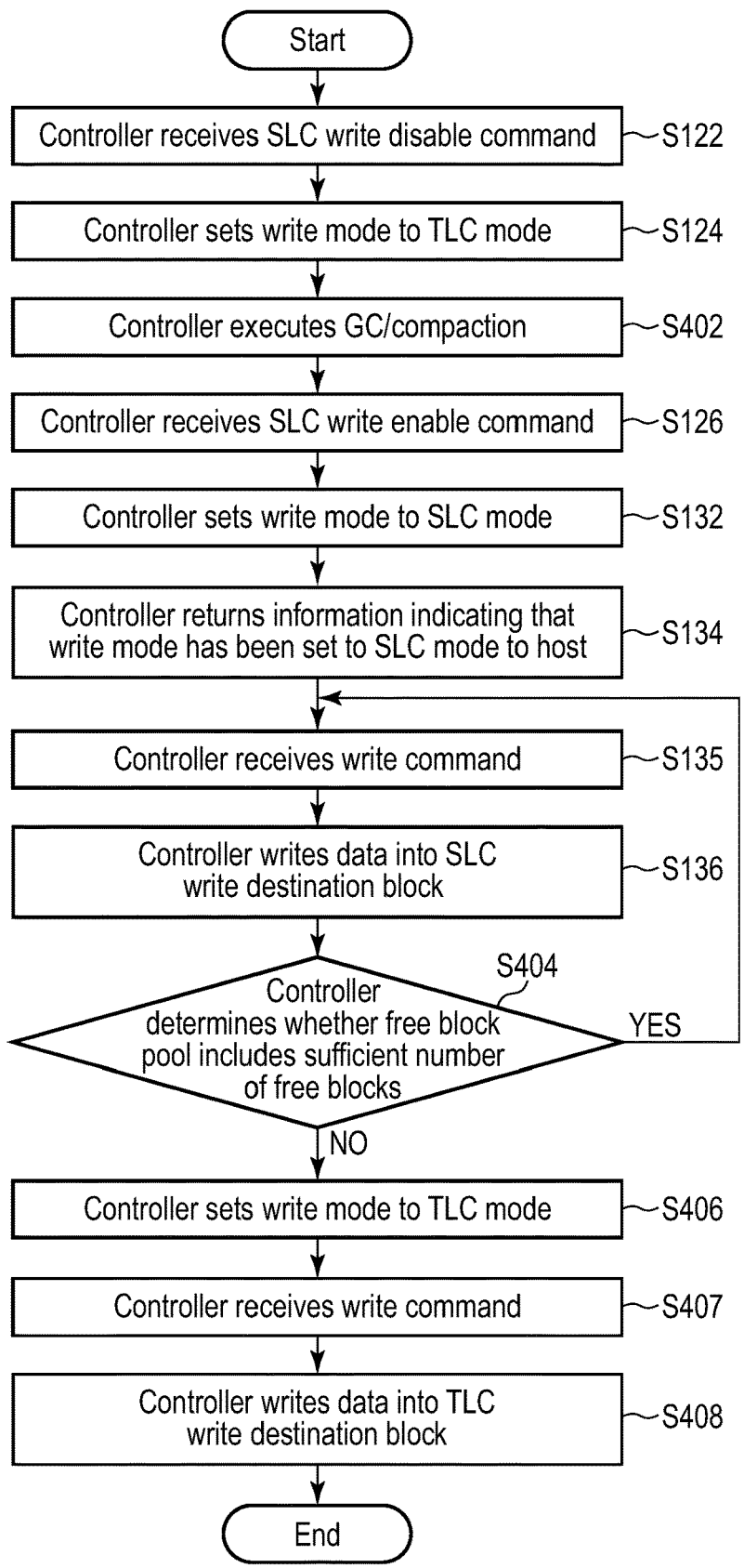
FIG. 14 is a flowchart showing an example of a write operation of a storage device of a storage system according to a fourth embodiment.

FIG. 14 is a flowchart showing an example of the write operation of the SSD 3 in the storage system 1 according to the fourth embodiment.

The operation of the host 2 may be any of the operation of the first embodiment shown in FIG. 5, that of the modification to the first embodiment shown in FIG. 8, that of the second embodiment shown in FIG. 9, and that of the third embodiment shown in FIG. 12.

As shown in FIG. 14, upon receiving the SLC write disable command from the host 2 in S122, the controller 4 sets the write mode to the TLC mode in S124. Then, upon receiving the write data from the host 2, the controller 4 writes the data into the TLC write destination block 126 of the NAND flash memory 5. After that, as shown in FIG. 3, the controller 4 executes the GC/compaction to generate the free blocks in S402. The GC/compaction may be executed in an idle period in which no I/O command such as the write command and the read command is sent from the host 2. If, however, there is no idle period, the execution of the I/O command from the host 2 may be delayed to execute the GC/compaction preferentially. The priority of the GC/compaction may be used as an index indicating which of the GC/compaction and the I/O command from a host is preferentially executed. The priority of the GC/compaction may be determined by the SSD 3 or may be designated by the host 2.

After S402, the controller 4 receives the SLC write enable command from the host 2 in S126, the controller 4 sets the write mode to the SLC mode in S132 and then returns information indicating that the write mode has been set to the SLC mode to the host 2 in S134.

The controller 4 receives the write command from the host 2 in S135. The controller 4 writes the data into the SLC write destination block 102 of the NAND flash memory 5 in S136, as shown in FIG. 2. If the controller 4 receives no write command from the host 2, the controller 4 does not execute the operations in S135 and S136.

After S136, the controller 4 determines in S404 whether the free block pool 116 includes a sufficient number of the free blocks 118.

If the controller 4 determines that the free block pool 116 includes a sufficient number of the free blocks (YES in S404), the controller 4 continues the operations in S135, S136, and S404.

If the controller 4 determines that the free block pool 116 does not include a sufficient number of the free blocks (NO in S404), the controller 4 sets the write mode to the TLC mode in S406. Upon receiving the write command from the host 2 in S407, the controller 4 writes the data into the TLC write destination block 126 of the NAND flash memory 5 in S408 and ends the operation.

FIG. 15A is a graph showing an example of changes in the number of the free blocks and the write performance in the first embodiment. FIG. 15A corresponds to FIG. 7B.

FIG. 15B is a graph showing an example of changes in the number of the free blocks and the write performance in the fourth embodiment. In the fourth embodiment, upon receiving the SLC write disable command, the SSD 3 executes the GC/compaction to increase the number of the free blocks. The number of the free blocks at the start of the target period is larger than that in the first embodiment. Even though the host 2 desires high write performance for a long period, the free blocks remain in the free block pool 116 until the end of the period, with the result that the write operation can be executed in the SLC mode.

However, in the first embodiment in which no GC/compaction is executed, even though the SSD 3 receives the SLC write disable command, the SSD 3 executes the write operation in the TLC mode so that the number of the free blocks are decreased gradually, as shown in FIG. 15A. Thus, when the host 2 desires high write performance for a long period, the number of the free blocks becomes equal to or smaller than a predetermined number in the middle of the period. After that, the write operation may not be executed in the SLC mode.

In the write operation of the SSD 3 shown in FIG. 14, the SSD 3 determines an execution time of the GC/compaction. However, the fourth embodiment can be modified such that the host 2 sets the execution time of the GC/compaction.

Figure 17:
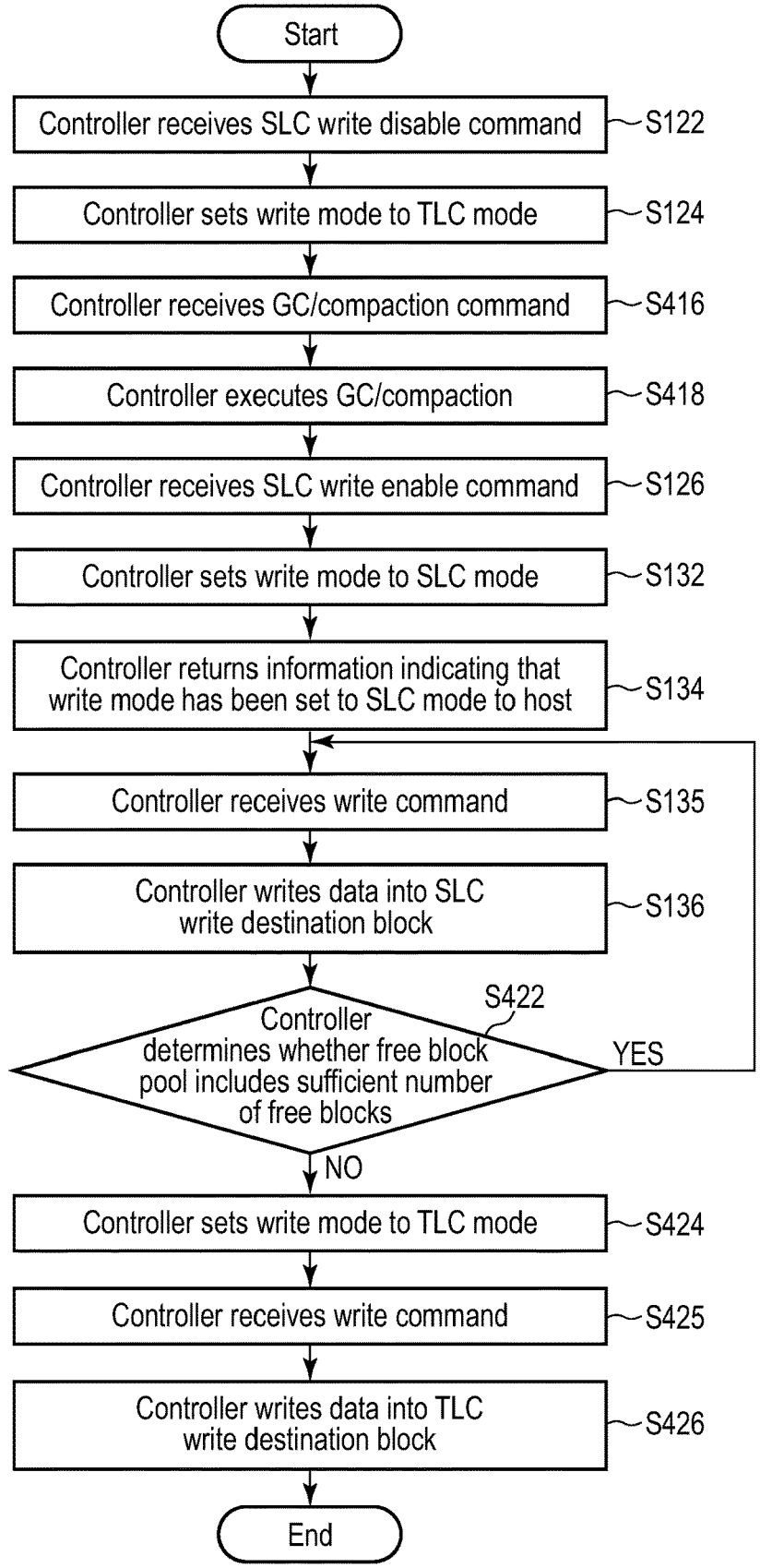
FIG. 17 is a flowchart showing another example of the write operation of the storage device of the storage system according to the fourth embodiment.

FIG. 16 is a flowchart showing an example of the write operation of the host 2 in the storage system 1 according to a modification of the fourth embodiment. FIG. 17 is a flowchart showing an example of the write operation of the SSD 3 in the storage system 1 according to the modification to the fourth embodiment.

As shown in FIG. 16, the host 2 sets the target period, the SLC write disable time, and the SLC write enable time in S102.

In S104, the host 2 determines whether a current time is the SLC write disable time. If the host 2 determines that the current time is not the SLC write disable time (NO in S104), the host 2 repeats the determination in S104 until the SLC write disable time. If the host 2 determines that the current time is the SLC write disable time (YES in S104), the host 2 sends the SLC write disable command to the SSD 3 in S106. The host 2 may send the write command to the SSD 3 after S106 if there is data to be written.

After S106, the host 2 sends a GC/compaction command to the SSD 3 in S412. The host 2 sends the GC/compaction command to the SSD 3 at a time when the host 2 does not send an I/O command to the SSD 3. The GC/compaction command may include the priority of the GC/compaction. The host 2 can control the priority of the GC/compaction by sending the GC/compaction command including the priority to the SSD 3, with the result that the host 2 can also control the degree of degradation of the write performance. Thus, the host 2 can control the degradation of the write performance due to the GC/compaction.

In S108, the host 2 determines whether a current time is the SLC write enable time. If the host 2 determines that the current time is not the SLC write enable time, the host 2 repeats the determination in S108 until the SLC write enable time.

If the host 2 determines that the current time is the SLC write enable time (YES in S108), the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

The operation in FIG. 16 is based on the operation of the host 2 in the first embodiment shown in FIG. 5, but may be based on the operation of the host 2 in the modification to the first embodiment shown in FIG. 8. In the latter case, S412 of sending the GC/compaction command to the SSD 3 is executed between S144 of sending the SLC write disable command to the SSD 3 and S148 of sending the SLC write enable command to the SSD 3, which are shown in FIG. 8.

In the SSD 3, as shown in FIG. 17, upon receiving the SLC write disable command from the host 2 in S122, the controller 4 sets the write mode to the TLC mode in S124. Then, upon receiving the write data from the host 2, the controller 4 writes the data into the TLC write destination block 126 of the NAND flash memory 5 as shown in FIG. 3. After that, upon receiving the GC/compaction command in S416, the controller 4 executes the GC/compaction in S418. When the controller 4 receives the priority of the GC/compaction together with the GC/compaction command, the controller 4 executes the GC/compaction in accordance with the received priority in S418.

After S418, upon receiving the SLC write enable command from the host 2 in S126, the controller 4 sets the write mode to the SLC mode in S132 and then returns information indicating that the write mode has been set to the SLC mode to the host 2 in S134.

Upon receiving the write command from the host 2 in S135, the controller 4 writes the data into the SLC write destination block 102 of the NAND flash memory 5 in S136, as shown in FIG. 2. If the controller 4 receives no write command from the host 2, the controller 4 does not execute the operations in S135 and S136.

After S136, the controller 4 determines in S422 whether the free block pool 116 includes a sufficient number of the free blocks 118.

If the controller 4 determines that the free block pool 116 includes a sufficient number of the free blocks (YES in S422), the controller 4 continues the operations in S135, S136, and S422.

If the controller 4 determines that the free block pool 116 does not include a sufficient number of the free blocks (NO in S422), the controller 4 sets the write mode to the TLC mode in S424. Upon receiving the write command from the host 2 in S425, the controller 4 writes the data into the TLC write destination block 126 of the NAND flash memory 5 in S426 and ends the operation.

Fifth Embodiment

The fourth embodiment relates to the start of the GC/compaction. If the GC/compaction is executed more than necessary, the write performance is deteriorated more than necessary. Next is a description of a fifth embodiment in which the stop of the GC/compaction is controlled.

Figure 19:
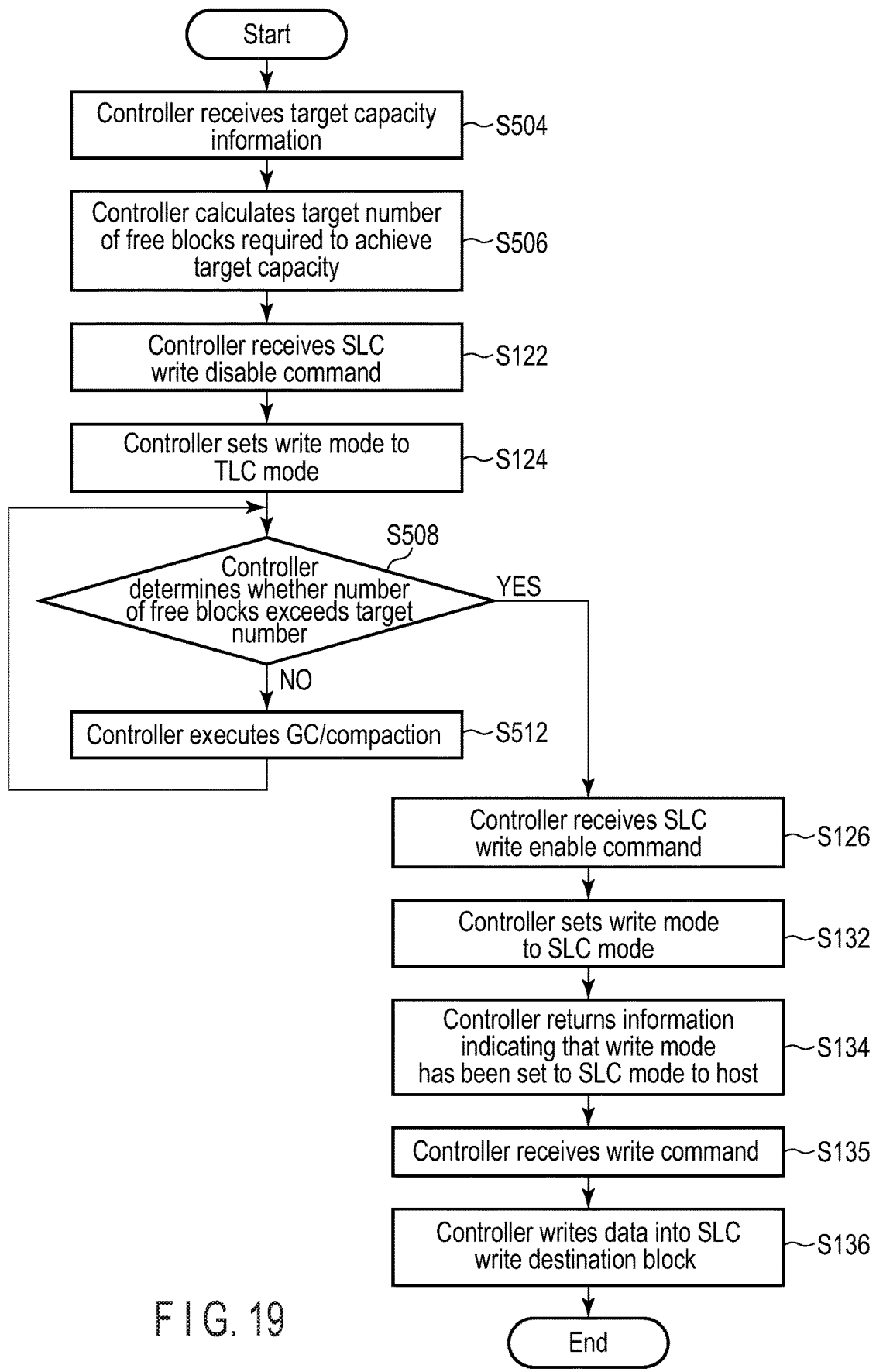
FIG. 19 is a flowchart showing an example of a write operation of a storage device of the storage system according to the fifth embodiment.

FIG. 18 is a flowchart showing an example of the write operation of the host 2 in the storage system 1 according to the fifth embodiment. FIG. 19 is a flowchart showing an example of the write operation of the SSD 3 in the storage system 1 according to the fifth embodiment.

As shown in FIG. 18, the host 2 sets the target period, the SLC write disable time, the SLC write enable time, and a target capacity of the free blocks in S102C.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the target capacity information of the free blocks to the SSD 3 in S502. The host 2 may send the target capacity information as a target capacity designation command. The target capacity of the free blocks is the number of the free blocks 118 allocated to the free block pool 116 at the end of the GC/compaction or at the start of the target period. In other words, the target capacity of the free blocks is an index to determine when the GC/compaction is to be stopped. The target capacity of the free blocks is so determined that a sufficient number of the free blocks are allocated to the free block pool 116 at the end of the target period.

After S502, the host 2 sends the SLC write disable command to the SSD 3 in S106. The host 2 may send the write command to the SSD 3 after S106 if there is data to be written.

After S106, the host 2 determines in S108 whether a current time is the SLC write enable time. If the host 2 determines that the current time is not the SLC write enable time, the host 2 repeats the determination in S108 until the SLC write enable time.

If the host 2 determines that the current time is the SLC write enable time (YES in S108), the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

Note that the order of sending the target capacity information and the SLC write disable command may be reversed. Instead of sending the target capacity information and the SLC write disable command separately, they can be sent simultaneously. For example, the target capacity information may be included in the parameter of the SLC write disable command.

The operation in FIG. 18 is based on the operation of the host 2 in the first embodiment shown in FIG. 5, but may be based on the operation of the host 2 in the modification to the first embodiment shown in FIG. 8. In the latter case, S502 of sending the target capacity information to the SSD 3 is executed before S144 of sending the SLC write disable command to the SSD 3 shown in FIG. 8.

In the SSD 3, as shown in FIG. 19, upon receiving the target capacity information of the free blocks from the host 2 in S504, the controller 4 divides the target capacity by the size of the block of data to be written in the SLC mode to calculate a target number of the free blocks required to achieve the target capacity of the free blocks in S506.

After S506, upon receiving the SLC write disable command from the host 2 in S122, the controller 4 sets the write mode to the TLC mode in S124. Then, when the controller 4 receives the write data from the host 2, the controller 4 writes the data into the TLC write destination block 126 of the NAND flash memory 5 as shown in FIG. 3.

When the host 2 changes a method of sending the target capacity information and the SLC write disable command from the example shown in FIG. 18, the SSD 3 changes a method of receiving the target capacity information and the SLC write disable command in accordance with the change of the sending method.

After S124, the controller 4 determines in S508 whether the number of the free blocks 118 which is allocated to the free block pool 116 exceeds the target number of the free blocks.

When the controller 4 determines that the number of the free blocks 118 does not exceed the target number of the free blocks (NO in S508), the controller 4 executes the GC/compaction in S512. The controller 4 executes the operation of S512 until the controller 4 determines that the number of the free blocks 118 exceeds the target number of the free blocks. That is, the controller 4 stops the GC/compaction when the number of the free blocks 118 exceeds the target number of the free blocks.

When the controller 4 determines that the number of the free blocks 118 exceeds the target number of the free blocks (YES in S508), upon receiving the SLC write enable command from the host 2 in S126, the controller 4 sets the write mode to the SLC mode in S132. The controller 4 returns information indicating that the write mode has been set to the SLC mode to the host 2 in S134.

Upon receiving the write command from the host 2 in S135, the controller 4 writes the data into the SLC write destination block 102 of the NAND flash memory 5 in S136 as shown in FIG. 2 and ends the operation. If the controller 4 receives no write command from the host 2, the controller 4 does not execute the operations in S135 and S136.

FIG. 20A is a graph showing an example of changes in the number of the free blocks and the write performance in the fourth embodiment shown in FIG. 15B. FIG. 20B is a graph showing an example of changes in the number of the free blocks and the write performance in the fifth embodiment.

As shown in FIG. 20A, in the fourth embodiment, when the SSD 3 receives the SLC write disable command, the controller 4 executes the GC/compaction to increase the number of the free blocks. During the GC/compaction, however, the SSD 3 stands by for the write operation of data from the host 2 and thus the write performance is degraded.

According to the fifth embodiment, however, as shown in FIG. 20B, when the SSD 3 receives the target capacity information from the host 2 together with the SLC write disable command and the target capacity of the free blocks is achieved, the controller 4 stops the GC/compaction. Thus, the GC/compaction is not executed more than necessary. The period of write performance degradation due to the GC/compaction is shorter than that in the fourth embodiment. Since the execution time of the GC/compaction is short, the degree of wear-out of the blocks does not increase.

Sixth Embodiment

In the fifth embodiment, the host 2 sets the target capacity of the free blocks and accordingly the SSD 3 determines the end time of the GC/compaction. Next is a description of a sixth embodiment in which the host 2 designates a target execution time of the GC/compaction and accordingly the SSD 3 determines the end time the GC/compaction.

Figure 21:
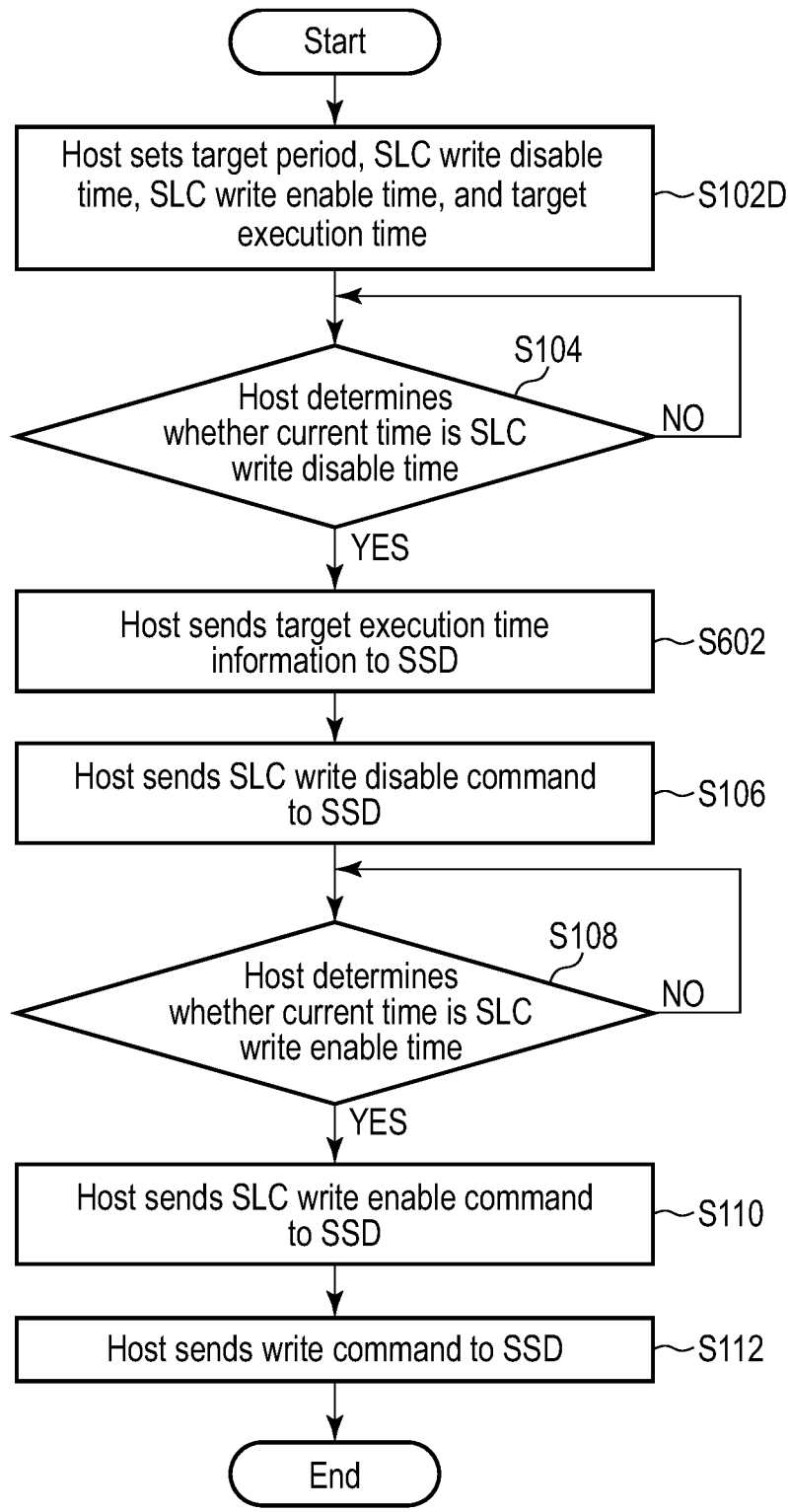
FIG. 21 is a flowchart showing an example of a write operation of a host of a storage system according to a sixth embodiment.

FIG. 21 is a flowchart showing an example of the write operation of the host 2 in the storage system 1 according to the sixth embodiment. FIG. 22 is a flowchart showing an example of the write operation of the SSD 3 in the storage system 1 according to the sixth embodiment.

As shown in FIG. 21, the host 2 sets the target period, the SLC write disable time, the SLC write enable time, and the target execution time of the CG/compaction in S102D.

In S104, the host 2 determines whether a current time is the SLC write disable time. If the host 2 determines that the current time is not the SLC write disable time, the host 2 repeats the determination in S104 until the SLC write disable time.

If the host 2 determines that the current time is the SLC write disable time (YES in S104), the host 2 sends the target execution time information of the CG/compaction to the SSD 3 in S602. The host 2 may send the target execution time information as a target execution time designation command. The target execution time is determined, for example, from a time that allows performance degradation due to the CG/compaction during the SLC write disable period.

After S602, the host 2 sends the SLC write disable command to the SSD 3 in S106. The host 2 may send the write command to the SSD 3 after S106 if there is data to be written.

After S106, the host 2 determines in S108 whether a current time is the SLC write enable time. If the host 2 determines that the current time is not the SLC write enable time, the host 2 repeats the operation in S108 until the SLC write enable time.

If the host 2 determines that the current time is the SLC write enable time (YES in S108), the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

Note that the order of sending the target execution time information and the SLC write disable command may be reversed. Instead of sending the target execution time information and the SLC write disable command separately, they can be sent simultaneously. For example, the target execution time information may be included in the parameter of the SLC write disable command.

The operation in FIG. 21 is based on the operation of the host 2 in the first embodiment shown in FIG. 5, but may be based on the operation of the host 2 in the modification to the first embodiment shown in FIG. 8.

In the latter case, S602 of sending the target execution time information to the SSD 3 is executed before S144 of sending the SLC write disable command to the SSD 3 shown in FIG. 8.

In the SSD 3, as shown in FIG. 22, the controller 4 receives the target execution time information of the CG/compaction from the host 2 in S602.

After S602, upon receiving the SLC write disable command from the host 2 in S122, the controller 4 sets the write mode to the TLC mode in S124. Then, when the controller 4 receives the write data from the host 2, the controller 4 writes the data into the TLC write destination block 126 of the NAND flash memory 5 as shown in FIG. 3.

When the host 2 changes a method of sending the target execution time information and the SLC write disable command from the example shown in FIG. 21, the SSD 3 changes a method of receiving the target execution time information and the SLC write disable command in accordance with the change of the sending method.

After S124, the controller 4 determines in S604 whether a CG/compaction execution time exceeds the target execution time.

When the controller 4 determines that the CG/compaction execution time does not exceed the target execution time (NO in S604), the controller 4 executes the GC/compaction in S606. The controller 4 executes the operation of S604 until the controller 4 determines that the CG/compaction execution time exceeds the target execution time. That is, the controller 4 stops the GC/compaction when the CG/compaction execution time exceeds the target execution time.

When the controller 4 determines that the CG/compaction execution time exceeds the target execution time (YES in S604) and receives the SLC write enable command from the host 2 in S126, the controller 4 sets the write mode to the SLC mode in S132. The controller 4 returns information indicating that the write mode has been set to the SLC mode to the host 2 in S134.

Upon receiving the write command from the host 2 in S135, the controller 4 writes the data into the SLC write destination block 102 of the NAND flash memory 5 in S136 as shown in FIG. 2 and ends the operation. If the controller 4 receives no write command from the host 2, the controller 4 does not execute the operations in S135 and S136.

Figure 23:
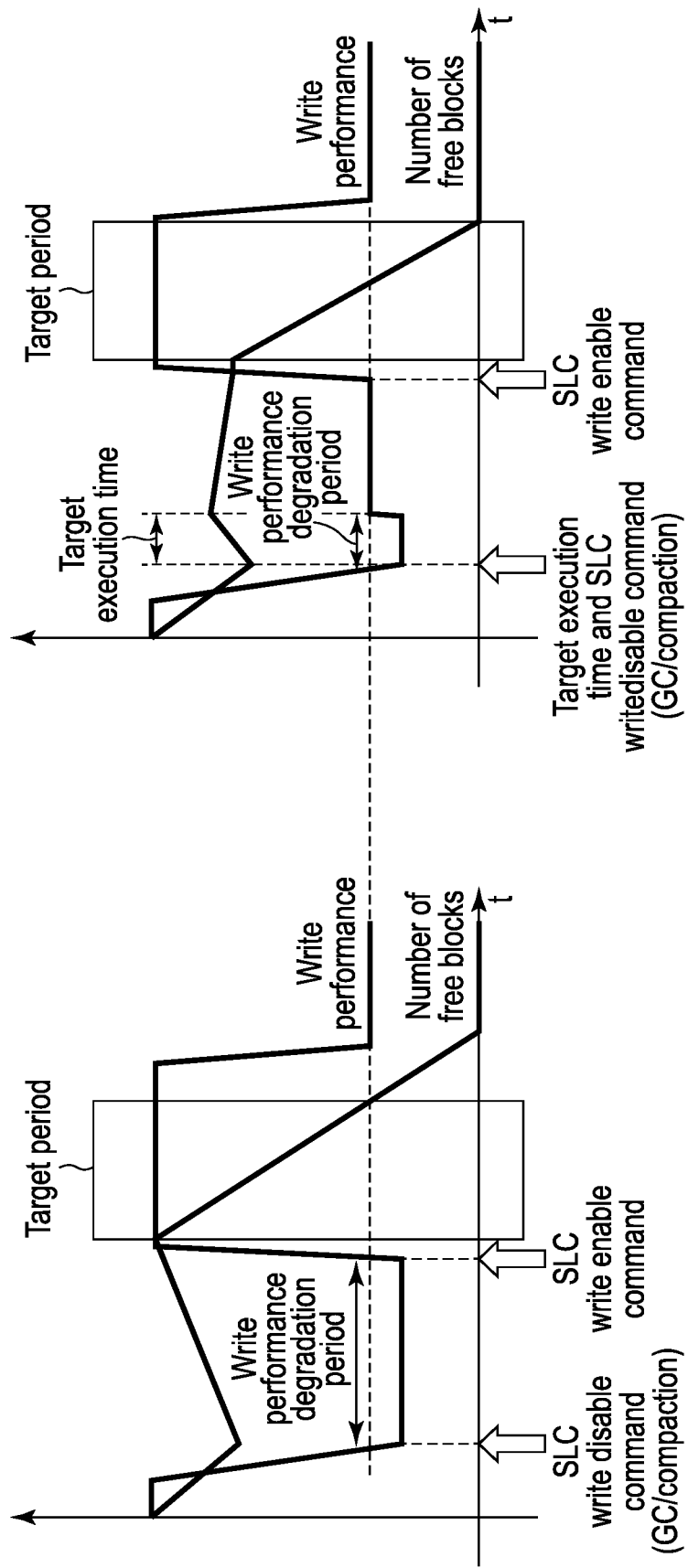
FIG. 23A is a graph showing an example of changes in the number of free blocks and a write performance in the fourth embodiment shown in FIG. 15B.
FIG. 23B is a graph showing an example of changes in the number of the free blocks and the write performance in the sixth embodiment.

FIG. 23A is a graph showing an example of changes in the number of the free blocks and the write performance in the fourth embodiment shown in FIG. 15B. FIG. 23B is a graph showing an example of changes in the number of the free blocks and the write performance in the sixth embodiment.

As shown in FIG. 23A, in the fourth embodiment, when the SSD 3 receives the SLC write disable command, the controller 4 executes the GC/compaction to increase the number of the free blocks. During the GC/compaction, however, the SSD 3 stands by for the write operation of data from the host 2 and thus the write performance is degraded.

According to the sixth embodiment, however, as shown in FIG. 23B, when the SSD 3 receives the target execution time information of the CG/compaction from the host 2 together with the SLC write disable command, if the CG/compaction execution time reaches the target execution time, the controller 4 stops the GC/compaction. Thus, the GC/compaction is not executed more than necessary. The period of write performance degradation due to the GC/compaction is shorter than that in the fourth embodiment. Since the time for executing the GC/compaction is short, the degree of wear-out of the blocks does not increase.

In the fifth and sixth embodiments, the host 2 sets the target capacity of the free blocks and the target execution time of the GC/compaction for each SLC write disable command, but may designate the target capacity and the target execution time only when they are changed. In this case, the SSD 3 may store the target capacity information and target execution time information. If the host 2 does not designate them, the SSD 3 may use the last stored target capacity information and target execution time information. In addition, the same target capacity and the same target execution time may be used each time. In this case, the host 2 may send the target capacity information and the target execution time information at the time of first sending of the SLC write disable command.

Seventh Embodiment

In the fifth or sixth embodiment, the host 2 sets the target capacity of the free blocks or the target execution time of the GC/compaction, and the SSD 3 determines the end time of the GC/compaction based on the designated target capacity or target execution time, thereby shortening a period during which the write performance is degraded. In the fifth or sixth embodiment, however, the first half of the period from the reception of the SLC write disable command to the reception of the SLC write enable command is a period during which the GC/compaction is executed, and the second half thereof is a period during which no GC/compaction is executed. Next is a description of a seventh embodiment in which the GC/compaction is executed with the priority based on the designation information of the host 2 during the period from the reception of the SLC write disable command to the reception of the SLC write enable command.

Figure 24:
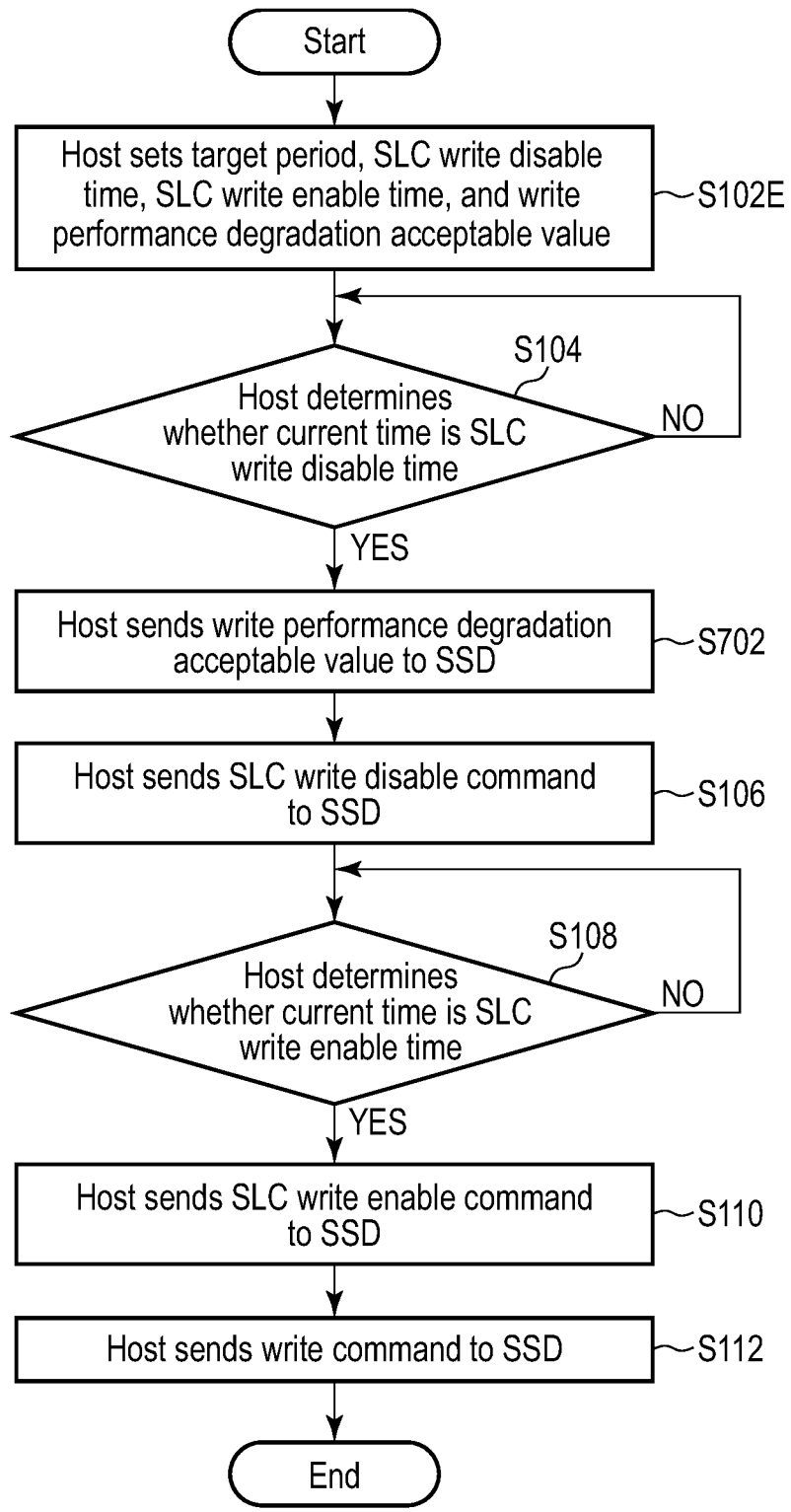
FIG. 24 is a flowchart showing an example of a write operation of a host of a storage system according to a seventh embodiment.
Figure 25:
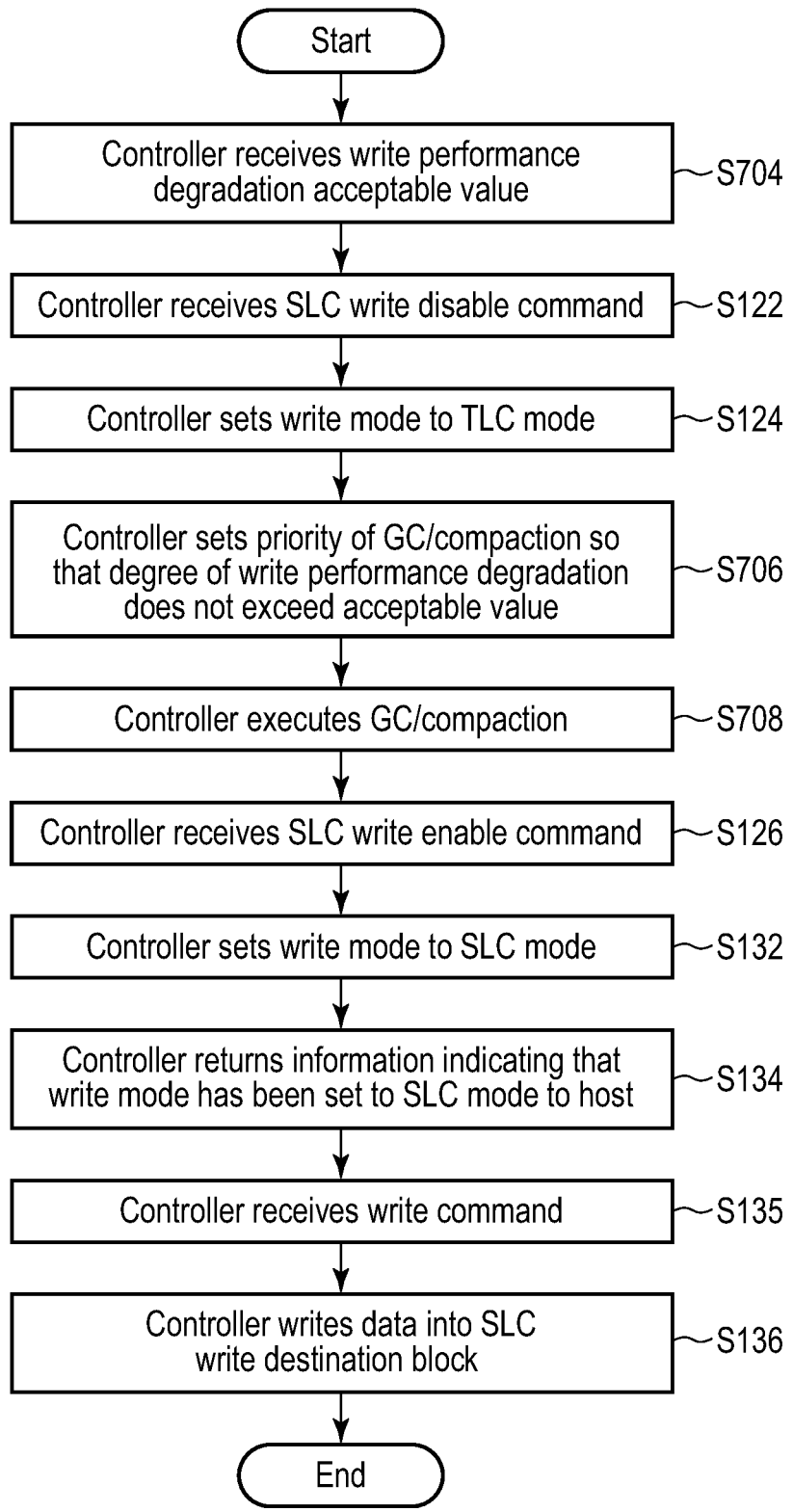
FIG. 25 is a flowchart showing an example of a write operation of a storage device of the storage system according to the seventh embodiment.

FIG. 24 is a flowchart showing an example of the write operation of the host 2 in the storage system 1 according to the seventh embodiment. FIG. 25 is a flowchart showing an example of the write operation of the SSD 3 in the storage system 1 according to the seventh embodiment.

As shown in FIG. 24, the host 2 sets the target period, the SLC write disable time, the SLC write enable time, and a write performance degradation acceptable value in S102E.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the write performance degradation acceptable value to the SSD 3 in S702.

The host 2 may send the write performance degradation acceptable value as an acceptable value designation command. The write performance can be represented by guaranteed throughput (bytes/second), latency (seconds) and the like. The lower value of the guaranteed throughput (bytes/second) and the upper value of the latency (seconds) are sent to the SSD 3 as acceptable values of the degradation.

After S702, the host 2 sends the SLC write disable command to the SSD 3 in S106.

After S106, the host 2 determines in S108 whether a current time is the SLC write enable time. If the host 2 determines that the current time is not the SLC write enable time (NO in S108), the host 2 repeats the operation in S108 until the SLC write enable time.

If the host 2 determines that the current time is the SLC write enable time (YES in S108), the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute it at all.

Note that the order of sending the write performance degradation acceptable value and the SLC write disable command may be reversed. Instead of sending the write performance degradation acceptable value and the SLC write disable command separately, they can be sent simultaneously. For example, the write performance degradation acceptable value may be included in the parameter of the SLC write disable command.

The operation in FIG. 24 is based on the operation of the host 2 in the first embodiment shown in FIG. 5, but may be based on the operation of the host 2 in the modification to the first embodiment shown in FIG. 8. In the latter case, S702 of sending the write performance degradation acceptable value to the SSD 3 is executed before S144 of sending the SLC write disable command to the SSD 3 shown in FIG. 8.

In the SSD 3, as shown in FIG. 25, the controller 4 receives the write performance degradation acceptable value from the host 2 in S704.

After S704, upon receiving the SLC write disable command from the host 2 in S122, the controller 4 sets the write mode to the TLC mode in S124. Then, when the controller 4 receives the write data from the host 2, the controller 4 writes the data into the TLC write destination block 126 of the NAND flash memory 5 as shown in FIG. 3.

When the host 2 changes a method of sending the write performance degradation acceptable value and the SLC write disable command from the example shown in FIG. 24, the SSD 3 also changes a method of receiving the write performance degradation acceptable value and the SLC write disable command in accordance with the change of the sending method.

After S124, the controller 4 sets the priority of the GC/compaction in S706 so that the degree of write performance degradation does not exceed the acceptable value. As the priority of the GC/compaction increases, the free block generation speed improves, but the write performance is degraded. As the priority of the GC/compaction lowers, the free block generation speed decreases, but the write performance is not so degraded. The controller 4 sets the priority of the GC/compaction in accordance with the write performance degradation acceptable value designated by the host 2. Unlike in the fifth and sixth embodiments, in the seventh embodiment, the GC/compaction is executed during a period from the reception of the SLC write disable command to the reception of the SLC write enable command.

After S706, the controller 4 executes the GC/compaction in S708 in accordance with the determined priority. As a result, the write performance is degraded by the GC/compaction, but the degree of write performance degradation falls within the acceptable value.

After S708, upon receiving the SLC write enable command from the host 2 in S126, the controller 4 sets the write mode to the SLC mode in S132 and then returns information indicating that the write mode has been set to the SLC mode to the host 2 in S134.

Upon receiving the write command from the host 2 in S135, the controller 4 writes the data into the SLC write destination block 102 of the NAND flash memory 5 in S136, as shown in FIG. 2. If the controller 4 receives no write command from the host 2, the controller 4 does not execute the operations in S135 and S136.

FIG. 26A is a graph showing an example of changes in the number of the free blocks and the write performance in the sixth embodiment shown in FIG. 23B. FIG. 26B is a graph showing an example of changes in the number of the free blocks and the write performance in the seventh embodiment. As shown in FIG. 26A, in the sixth embodiment, when the SSD 3 receives the SLC write disable command, it executes the GC/compaction to increase the number of the free blocks. During the GC/compaction, however, the SSD 3 stands by for the write operation of data from the host 2 and thus the write performance is degraded. The GC/compaction is executed only in the first half of the period from the reception of the SLC write disable command to the reception of the SLC write enable command. Thus, the write performance varies between the first half and the second half of the period from the reception of the SLC write disable command to the reception of the SLC write enable command.

According to the seventh embodiment, however, the SSD 3 receives the write performance degradation acceptable value from the host 2 together with the SLC write disable command. The SSD 3 calculates the priority of the GC/compaction according to the degradation acceptable value. Therefore, as shown in FIG. 26B, the GC/compaction is executed in accordance with the priority during the period from the reception of the SLC write disable command to the reception of the SLC write enable command. The write performance is made uniform the period.

Eighth Embodiment

In the seventh embodiment, the write performance can be prevented from being degraded; however, it may be likely that the number of the free blocks allocated to the free block pool 116 does not reach a desired number at the end of the GC/compaction. Next is a description of an eighth embodiment in which the degradation of write performance can be minimized while a desired number of the free blocks are generated.

Figure 28:
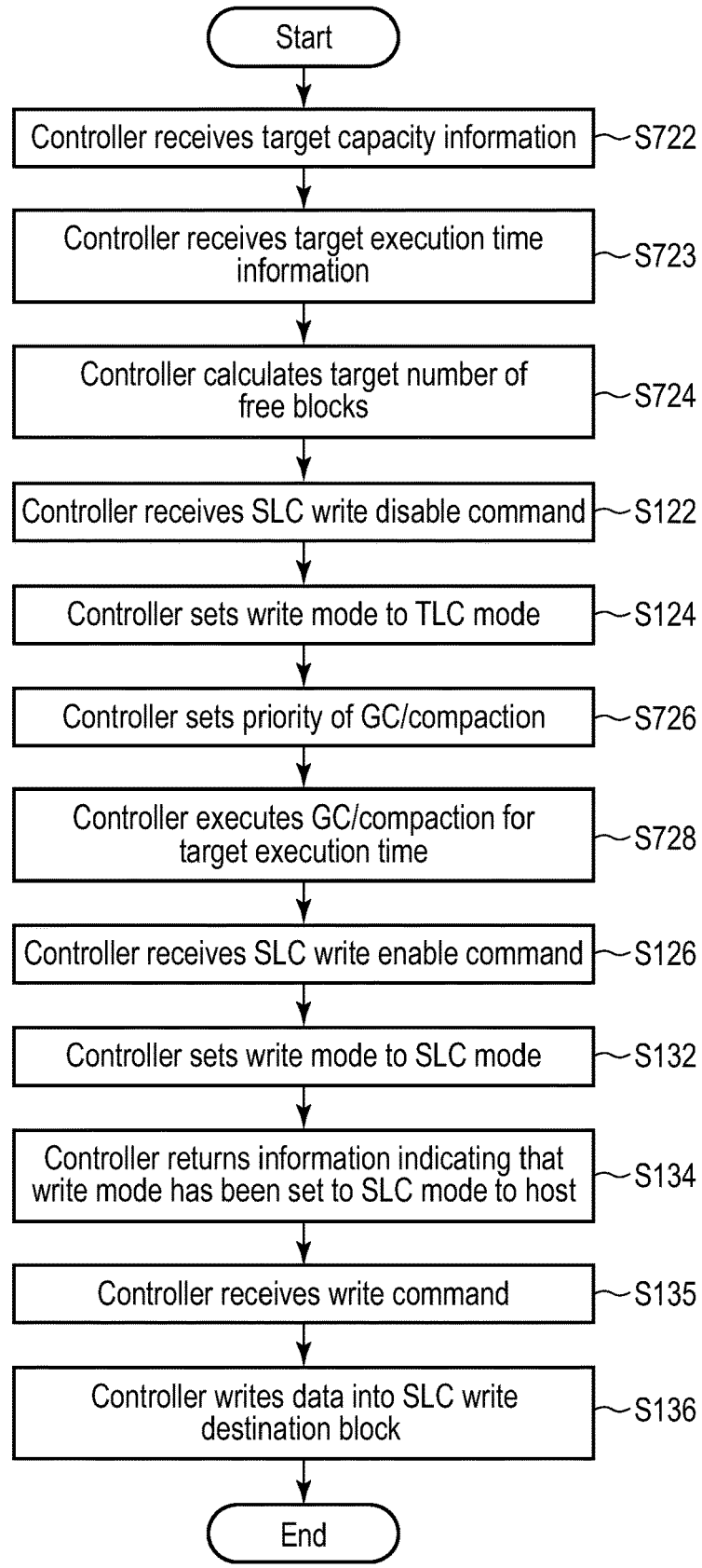
FIG. 28 is a flowchart showing an example of a write operation of a storage device of the storage system according to the eighth embodiment.

FIG. 27 is a flowchart showing an example of the write operation of the host 2 in the storage system 1 according to the eighth embodiment. FIG. 28 is a flowchart showing an example of the write operation of the SSD 3 in the storage system 1 according to the eighth embodiment.

As shown in FIG. 27, the host 2 sets the target period, the SLC write disable time, the SLC write enable time, the target capacity of the free blocks, and the target execution time of the CG/compaction in S102F.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the target capacity information of the free blocks to the SSD 3 in S712. The host 2 may send the target capacity information as the target capacity designation command. The target capacity of the free blocks is the capacity described in the fifth embodiment.

After S712, the host 2 sends the target execution time information of the GC/compaction to the SSD 3 in S714. The host 2 may send the target execution time information as the target execution time designation command. The target execution time of the GC/compaction is the time described in the sixth embodiment.

After S714, the host 2 sends the SLC write disable command to the SSD 3 in S106.

After S106, the host 2 determines in S108 whether a current time is the SLC write enable time. If the host 2 determines that the current time is not the SLC write enable time (NO in S108), the host 2 repeats the determination in S108 until the SLC write enable time.

If the host 2 determines that the current time is the SLC write enable time (YES in S108), the host 2 sends the SLC write enable command to the SSD 3 in S110. The host 2 sends the write command to the SSD 3 in S112 and ends the operation. Note that the operation in S112 is executed when there is data to be written. Thus, the host 2 may execute the operation in S112 a plurality of times or may not execute the operation in S112 at all.

Note that the order of sending the target capacity information, the target execution time information, and the SLC write disable command may be changed. Instead of sending the target capacity information, the target execution time information, and the SLC write disable command separately, they can be sent simultaneously. For example, the target capacity information and the target execution time information may be included in the parameters of the SLC write disable command.

The operation in FIG. 27 is based on the operation of the host 2 in the first embodiment shown in FIG. 5, but may be based on the operation of the host 2 in the modification to the first embodiment shown in FIG. 8. In the latter case, S712 of sending the target capacity information and S714 of sending the target execution time information are executed before S144 of sending the SLC write disable command to the SSD 3 shown in FIG. 8.

In the SSD 3, as shown in FIG. 28, the controller 4 receives the target capacity information from the host 2 in S722 and receives the target execution time information from the host 2 in S723.

After S723, the controller 4 divides the target capacity by the size of the block of data to be written in the SLC mode to calculate a target number of the free blocks required to achieve the target capacity of the free blocks in S724.

After S724, upon receiving the SLC write disable command from the host 2 in S122, the controller 4 sets the write mode to the TLC mode in S124. Then, when the controller 4 receives the write data from the host 2, the controller 4 writes the data into the TLC write destination block 126 of the NAND flash memory 5 as shown in FIG. 3.

When the host 2 changes a method of sending the target capacity information, the target execution time information, and the SLC write disable command from the example shown in FIG. 27, the SSD 3 changes a method of receiving the target capacity information, the target execution time information, and the SLC write disable command in accordance with the sending method.

In S726, the controller 4 sets the priority of the GC/compaction so that the number of the free blocks allocated to the free block pool 116 reaches the target number of the free blocks. The higher the priority of the GC/compaction, the higher the rate of increase in the number of the free blocks. The lower the priority of the GC/compaction, the lower the rate of increase in the number of the free blocks.

After S726, the controller 4 executes the GC/compaction only for the target execution time in accordance with the determined priority in S728. Thus, the GC/compaction makes it possible to generate the target number of the free blocks and minimize the degradation of the write performance.

After S728, upon receiving the SLC write enable command from the host 2 in S126, the controller 4 sets the write mode to the SLC mode in S132. The controller 4 returns information indicating that the write mode has been set to the SLC mode to the host 2 in S134.

Upon receiving the write command from the host 2 in S135, the controller 4 writes the data into the SLC write destination block 102 of the NAND flash memory 5 in S136, as shown in FIG. 2. If the controller 4 receives no write command from the host 2, the controller 4 does not execute the operations in S135 and S136.

Figure 29B:
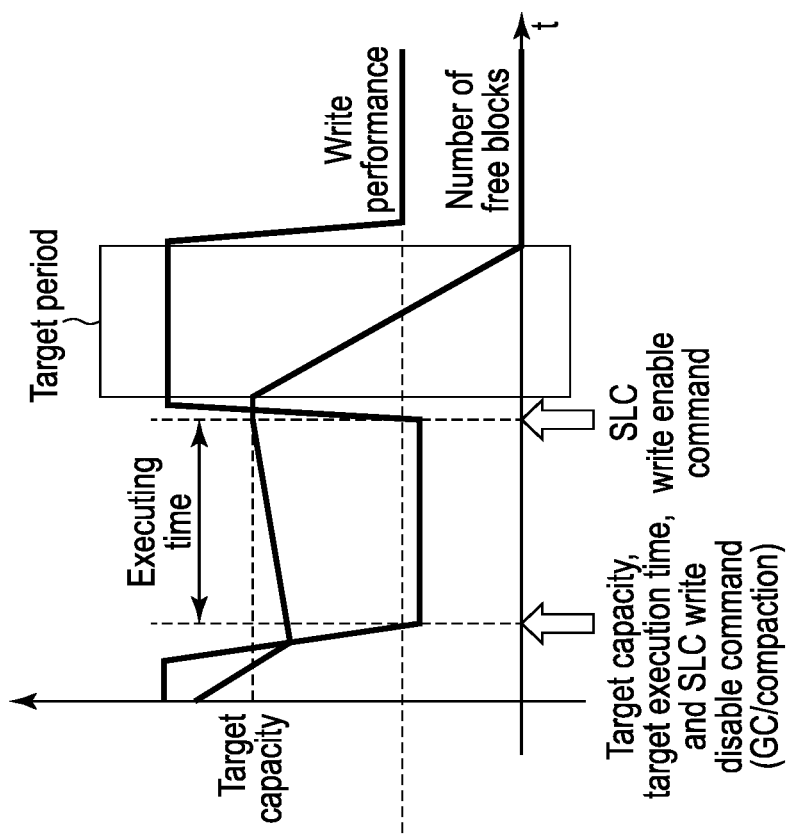
FIG. 29B is a graph showing an example of changes in the number of the free blocks and the write performance in the eighth embodiment.
Figure 29A:
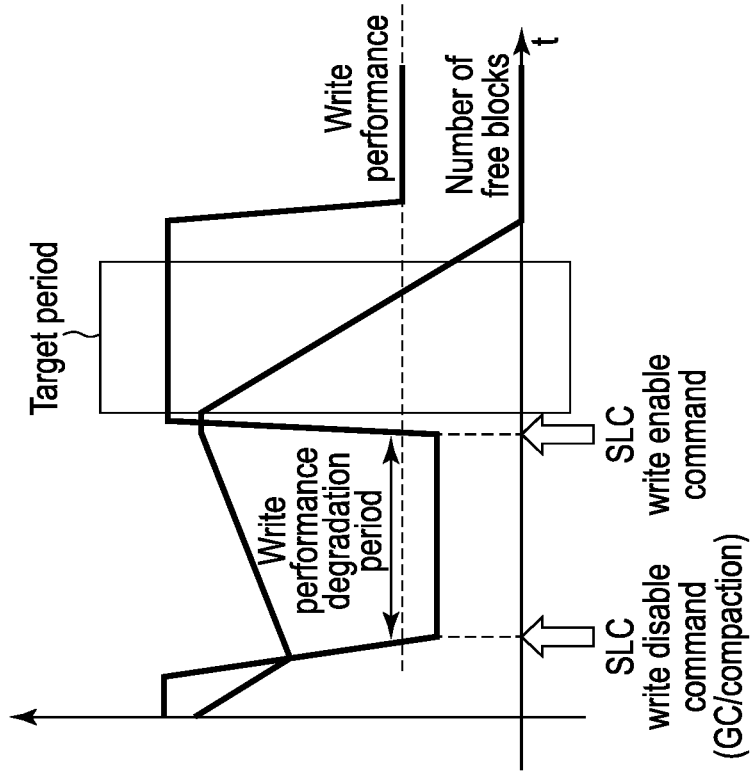
FIG. 29A is a graph showing an example of changes in the number of free blocks and a write performance in the fourth embodiment shown in FIG. 15B.

FIG. 29A is a graph showing an example of changes in the number of the free blocks and the write performance in the fourth embodiment shown in FIG. 15B. FIG. 29B is a graph showing an example of changes in the number of the free blocks and the write performance in the eighth embodiment.

As shown in FIG. 29A, in the fourth embodiment, the GC/compaction is executed to increase the number of the free blocks for the period from the reception of the SLC write disable command to the reception of the SLC write enable command. During the GC/compaction, the SSD 3 stands by for the write operation of data from the host 2 and thus the write performance is degraded.

According to the eighth embodiment, as shown in FIG. 29B, the SSD 3 receives the target capacity information and the target execution time information together with the SLC write disable command from the host 2. The controller 4 determined the priority of the GC/compaction such that the number of the free blocks allocated to the free block pool 116 reaches the target number of the free blocks at the end of the GC/compaction. Thus, the GC/compaction makes it possible to generate the target number of the free blocks and minimize the degradation of the write performance.

Ninth Embodiment

A ninth embodiment in which the controller 4 stops the GC/compaction when a WAF (write amplification factor) is may be degraded due to the GC/compaction, will be described.

Figure 30:
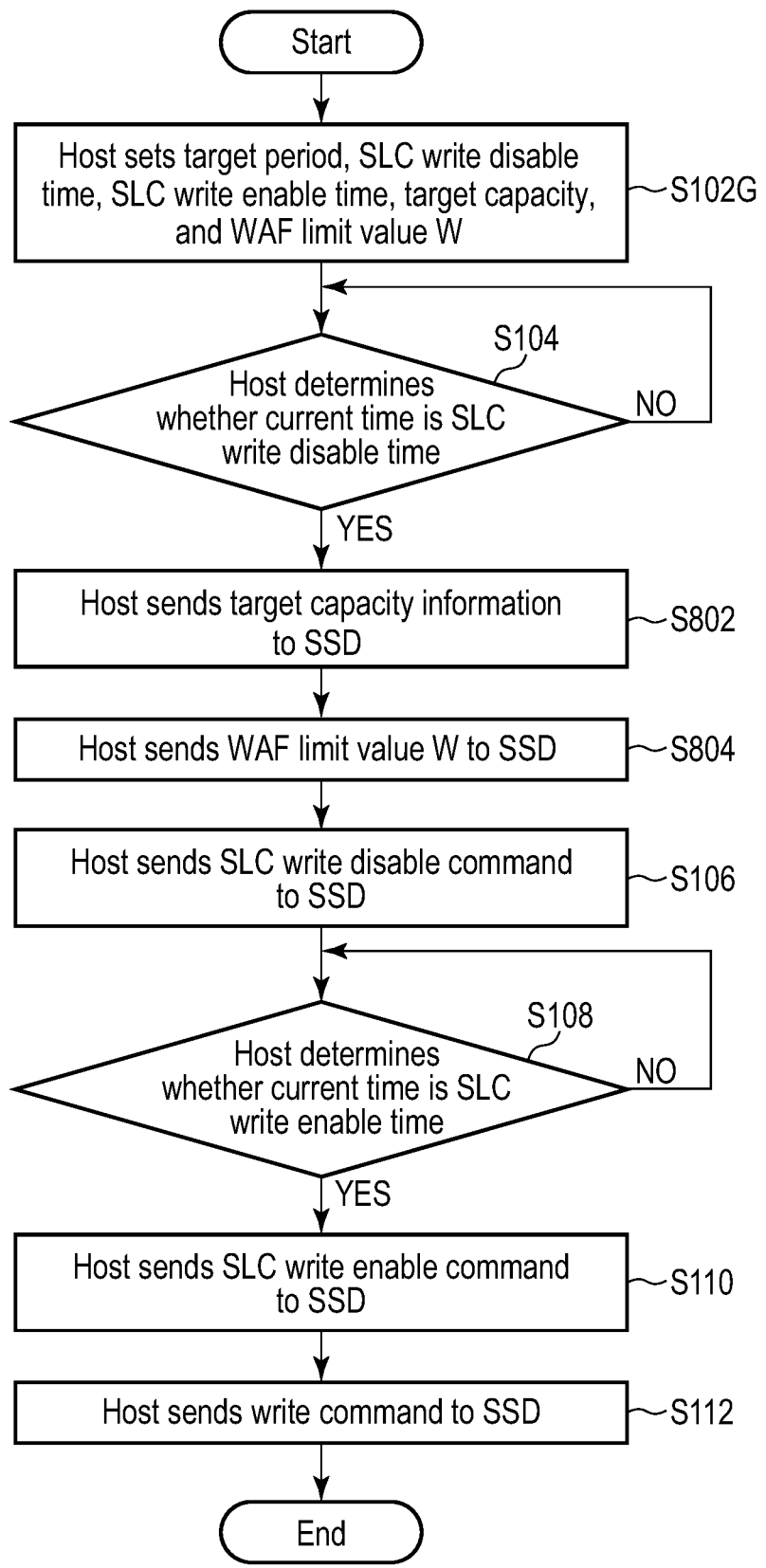
FIG. 30 is a flowchart showing an example of a write operation of a host of a storage system according to a ninth embodiment.
Figure 31:
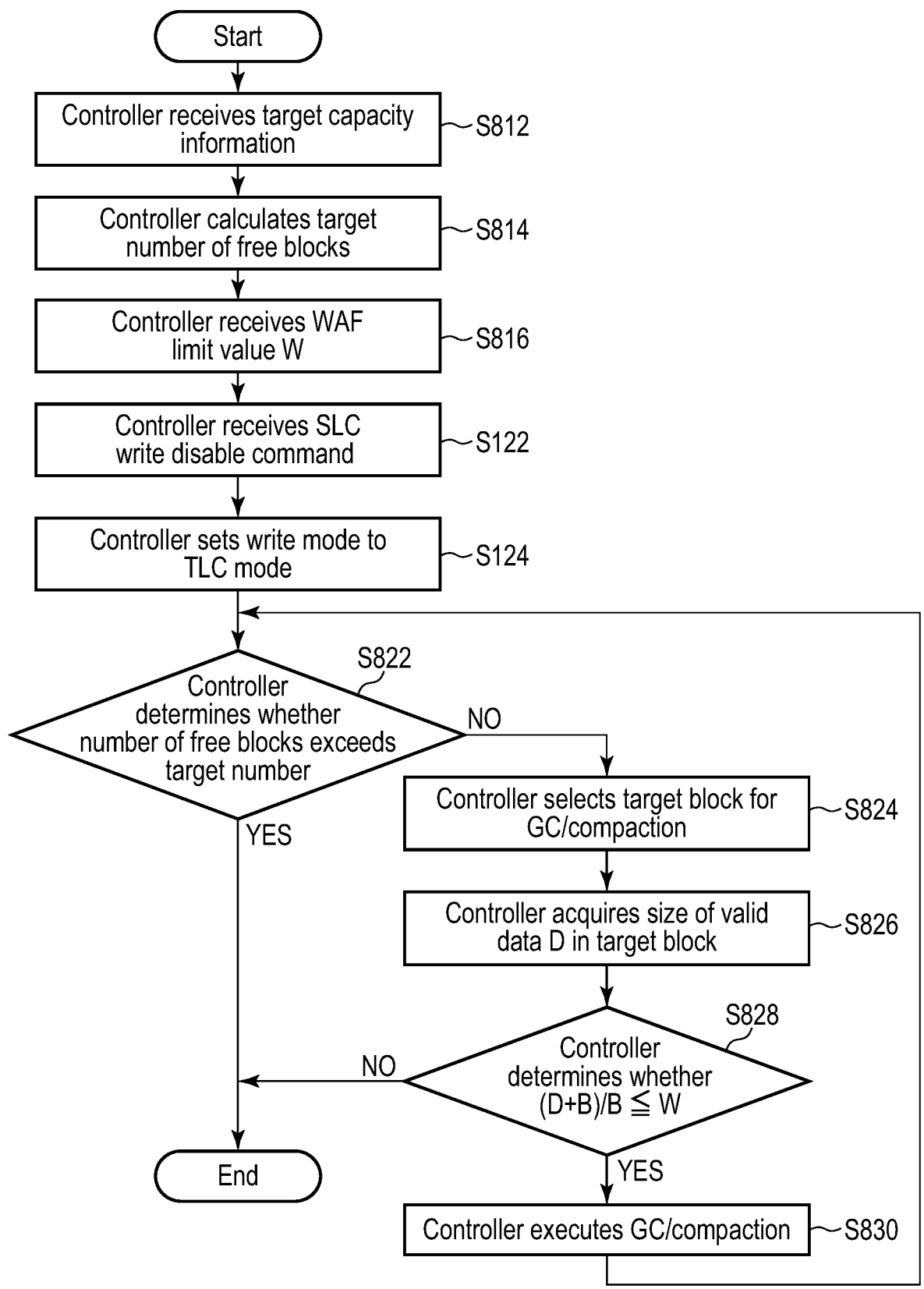
FIG. 31 is a flowchart showing an example of a write operation of a storage device of the storage system according to the ninth embodiment.

FIG. 30 is a flowchart showing an example of the write operation of the host 2 in the storage system 1 according to the ninth embodiment. FIG. 31 is a flowchart showing an example of the write operation of the SSD 3 in the storage system 1 according to the ninth embodiment.

As shown in FIG. 30, in S102G, the host 2 sets the target period, the SLC write disable time, the SLC write enable time, the target capacity of the free blocks, and a WAF limit value W.

In S104, the host 2 determines whether a current time is the SLC write disable time. If the host 2 determines that the current time is not the SLC write disable time (NO in S104), the host 2 repeats the determination in S104 until the SLC write disable time.

If the host 2 determines that the current time is the SLC write disable time (YES in S104), the host 2 sends the target capacity information to the SSD 3 in S802. The host 2 may send the target capacity information as the target capacity designation command. The target capacity of the free blocks is the capacity described in the fifth embodiment.

After S802, the host 2 sends the WAF limit value W to the SSD 3 in S804. The host 2 may send the WAF limit value W as a WAF limit value designation command. The WAF is the ratio of the amount of data actually written into the NAND flash memory 5 to the amount of write data sent from the host 2, and becomes greater than one by the GC/compaction. When the WAF increases, a program/erase cycle also increases and thus the degree of wear-out the NAND flash memory 5 increases. In the ninth embodiment, the controller 4 stops the GC/compaction based on the WAF, and the WAF limit value W relates to a stop condition.

After S804, the host 2 sends the SLC write disable command to the SSD 3 in S106.

After S106, the host 2 determines in S108 whether a current time is the SLC write enable time. If the host 2 determines that the current time is not the SLC write enable time (NO in S108), the host 2 repeats the determination in S108 until the SLC write enable time.

If the host 2 determines that the current time is the SLC write enable time (YES in S108), the host 2 sends the SLC write enable command to the SSD 3 in S110 and ends the operation. If there is data to be written, the host 2 sends the write command to the SSD 3 in S112.

Note that the order of sending the target capacity information and the WAF limit value W may be reversed. Instead of sending the target capacity information, the WAF limit value W, and the SLC write disable command separately, they can be sent simultaneously. For example, the target capacity information and the WAF limit value W may be included in the parameters of the SLC write disable command.

The operation in FIG. 30 is based on the operation of the host 2 in the first embodiment shown in FIG. 5, but may be based on the operation of the host 2 in the modification to the first embodiment shown in FIG. 8. In the latter case, S802 of sending the target capacity information to the SSD 3 and S804 of sending the WAF limit value W to the SSD 3 are executed before S144 of sending the SLC write disable command to the SSD 3 shown in FIG. 8.

In the SSD 3, as shown in FIG. 31, upon receiving the target capacity information from the host 2 in S812, the controller 4 divides the target capacity by the size of the block of data to be written in the SLC mode to calculate the target number of the free blocks required to achieve the target capacity of the free blocks in S814.

After S814, the controller 4 receives the WAF limit value W from the host 2 in S816.

After S816, upon receiving the SLC write disable command from the host 2 in S122, the controller 4 sets the write mode to the TLC mode in S124. Then, when the controller 4 receives the write data from the host 2, the controller 4 writes the data into the TLC write destination block 126 of the NAND flash memory 5 as shown in FIG. 3.

When the host 2 changes a method of sending the target capacity information, the WAF limit value W, and the SLC write disable command from the example shown in FIG. 30, the controller 4 changes a method of receiving the target capacity information, the WAF limit value W, and the SLC write disable command in accordance with the sending method.

After S124, the controller 4 determines in S822 whether the number of the free blocks exceeds the target number of the free blocks.

When the controller 4 determines that the number of the free blocks exceeds the target number of the free blocks (YES in S822), the controller 4 ends the operation. When the controller 4 receives the write data from the host 2, the controller 4 writes the data into the TLC write destination block 126 of the NAND flash memory 5, as shown in FIG. 3.

When the controller 4 determines that the number of the free blocks does not exceed the target number of the free blocks (NO in S822), the controller 4 selects a target block for the GC/compaction in S824 and sets the selected block as a copy source block. An example of a method of selecting the target block is to select the blocks in an increasing order of the amount of valid data. Another example of the selecting method is to select a block or blocks which store cold data that is unlikely to be overwritten in the future and which does not exceed the WAF limit value.

After S824, the controller 4 acquires a size of valid data D in the target block for the GC/compaction in S826 and determines whether (D+B)/B is equal to or smaller than W in S828. B is the data size of the block. (D+B)/B represents a WAF in which data of size D is written by the current GC/compaction and data of size B will be written in the future. In S828, therefore, the controller 4 determines whether the WAF is degraded by the WAF limit value W or more.

If the controller 4 determines that (D+B)/B W is satisfied (YES in S828), the controller 4 executes the GC/compaction in S830. After S830, the controller 4 executes the determination in S822.

If the controller 4 determines that (D+B)/B W is not satisfied (NO in S828), the controller 4 ends the operation.

Figure 32:
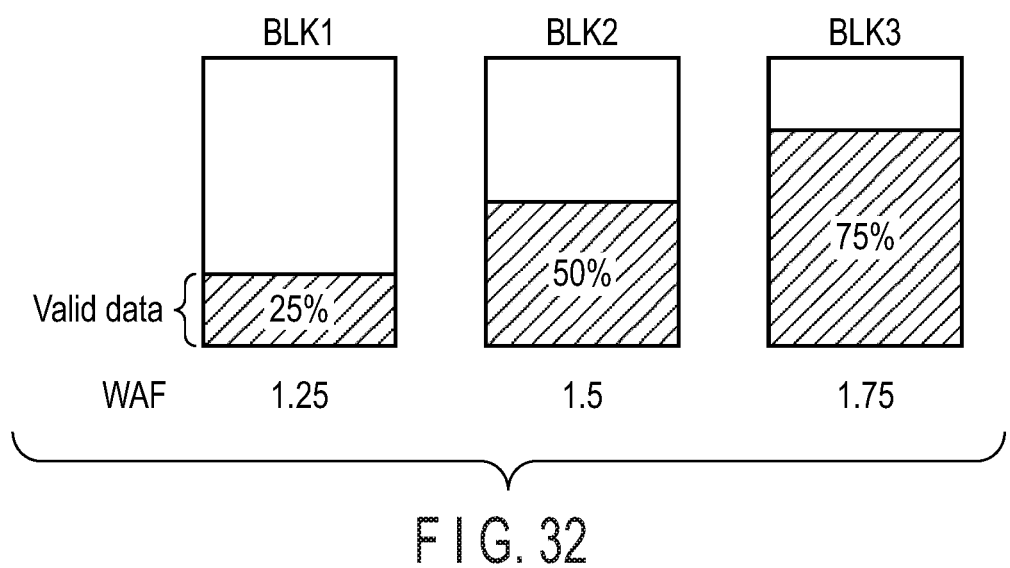
FIG. 32 illustrates the example of the write operation of the storage device according to the ninth embodiment.

FIG. 32 is a graph showing an example of changes in the WAF in the GC/compaction. Assume that the target number of the free blocks is three and blocks BLK1, BLK2, and BLK3 can be selected as the copy source block. The size of the valid data of the blocks BLK1, BLK2, and BLK3 are 25%, 50%, and 75%, respectively. The WAF limit value W is set to 1.5.

First, the block BLK1 is selected as the copy source block. The WAF is 1.25, the determination in S828 is YES, and the GC/compaction is executed in S803.

Then, the block BLK2 is selected as the copy source block. The WAF is 1.5, the determination in S828 is YES, and the GC/compaction is executed in S803.

Finally, the block BLK3 is selected as the copy source block. The WAF is 1.75, the determination in S828 is NO, and the GC/compaction is not executed.

According to the ninth embodiment, when the WAF is likely to be degraded due to the GC/compaction, the GC/compaction is stopped, with the result that the degree of wear-out of the NAND flash memory 5 does not increase.

Tenth Embodiment

In the ninth embodiment, the performance of the GC/compaction is controlled based on the WAF related to one GC/compaction. Next is a description of a tenth embodiment in which the GC/compaction is controlled based on the average value of the WAF after the start of the GC/compaction.

Figure 33:
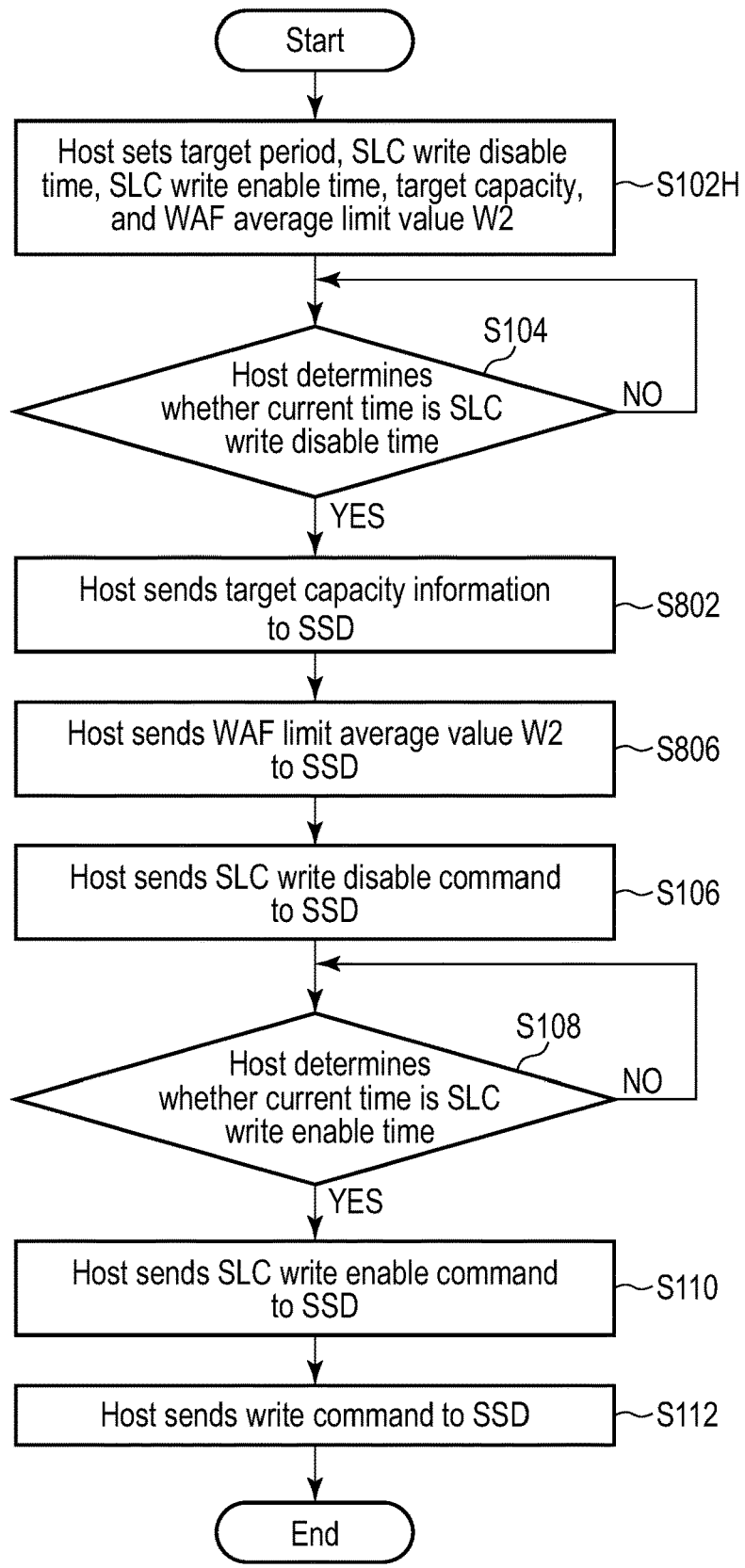
FIG. 33 is a flowchart showing an example of a write operation of a host of a storage system according to a tenth embodiment.
Figure 34:
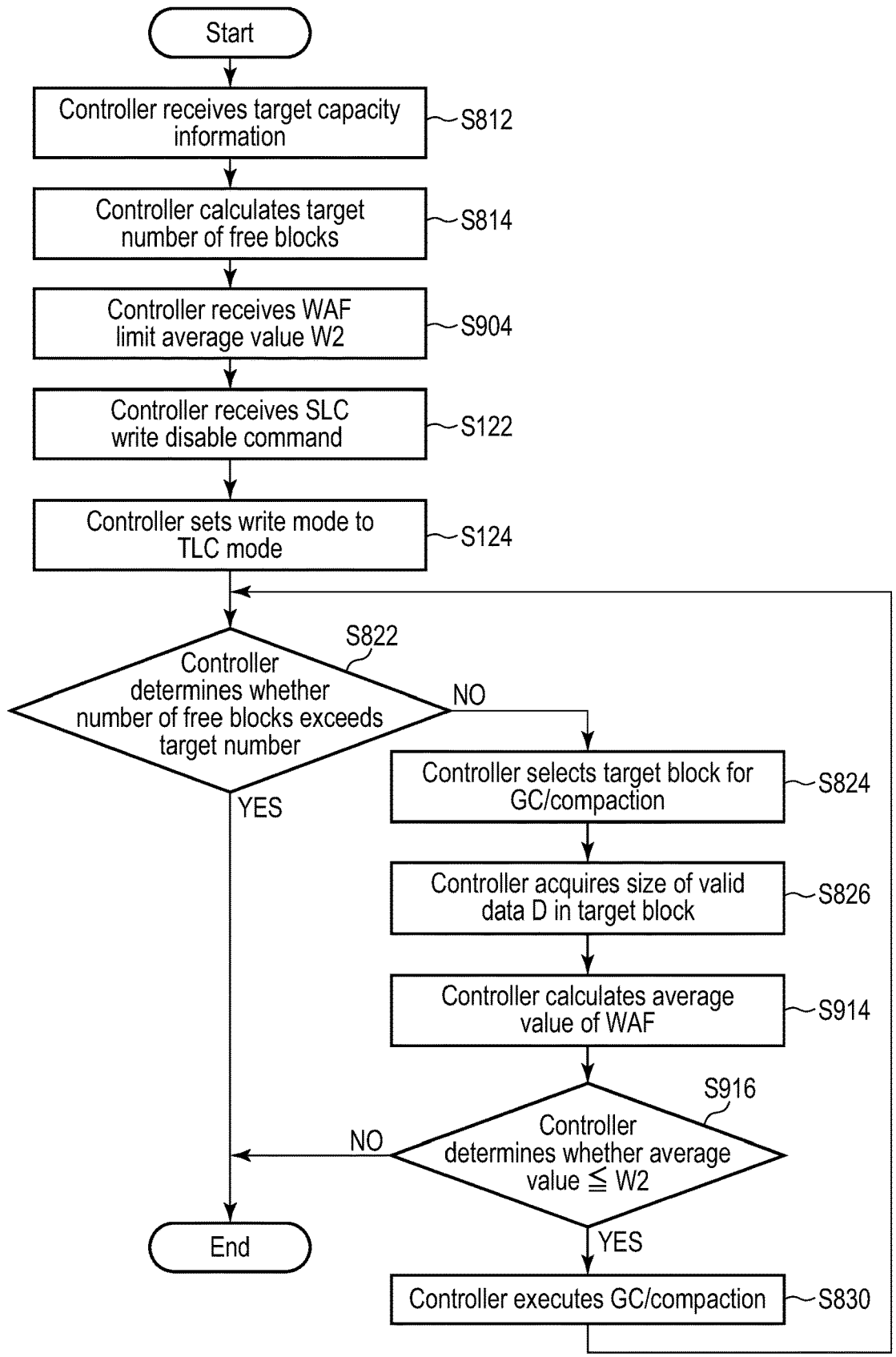
FIG. 34 is a flowchart showing an example of a write operation of a storage device of the storage system according to the tenth embodiment.

FIG. 33 is a flowchart showing an example of the write operation of the host 2 in the storage system 1 according to the tenth embodiment. FIG. 34 is a flowchart showing an example of the write operation of the SSD 3 in the storage system 1 according to the tenth embodiment. FIG. 35 is a graph showing an example of changes in the WAF in the write operation of the SSD 3 according to the tenth embodiment.

As shown in FIG. 33, the operation of the host 2 in the tenth embodiment differs from the operation in the ninth embodiment in the following two points. S102G (FIG. 30) of setting the target period, the SLC write disable time, the SLC write enable time, the target capacity, and the WAF limit value W is changed to S102H (FIG. 33) of setting the target period, the SLC write disable time, the SLC write enable time, the target capacity, and a WAF average limit value W2. S804 (FIG. 30) of sending the WAF limit value W to the SSD 3 is changed to S806 (FIG. 33) of sending the WAF limit average value W2 to the SSD 3.

As shown in FIG. 34, the operation of the SSD 3 in the tenth embodiment differs from the operation in the ninth embodiment in the following three points. S816 (FIG. 31) of receiving the WAF limit value W from the host 2 is changed to S904 (FIG. 34) of receiving the WAF limit average value W2 from the host 2. S914 (FIG. 34) of calculating the average value of the WAF is added after S826 (FIG. 31) of acquiring the size of the valid data D from the target block for the GC/compaction. S828 (FIG. 31) of determining whether (D+B)/B is equal to or smaller than W is changed to S916 (FIG. 34) of determining whether the average value of the WAF is equal to or smaller than the WAF limit average value W2.

FIG. 35 is a graph showing an example of changes in the WAF in the GC/compaction. Assume that the target number of the free blocks is three and blocks BLK1, BLK2, and BLK3 can be selected as the copy source block. The size of the valid data of the blocks BLK1, BLK2, and BLK3 are 25%, 50%, and 75%, respectively. The WAF limit value W2 is set to 1.5.

First, the block BLK1 is selected as the copy source block. The WAF is 1.25, the determination in S916 is YES, and the GC/compaction is executed in S830.

Then, the block BLK2 is selected as the copy source block. The WAF average value is 1.375, the determination in S916 is YES, and the GC/compaction is executed in S830.

Finally, the block BLK3 is selected as the copy source block. The WAF average value is 1.5, the determination in S916 is YES, and the GC/compaction is executed in S830.

According to the tenth embodiment, too, when the WAF is likely to be degraded due to the GC/compaction, the GC/compaction is stopped, with the result that the degree of wear-out of the NAND flash memory 5 does not increase.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device connectable to a host, comprising:
a nonvolatile memory; and
a controller electrically connected to the nonvolatile memory, wherein
the controller is configured to select a first mode as a write mode to write data from the host to the nonvolatile memory when the controller receives a first instruction from the host;
n-bit data is written into a memory cell in a first area of the nonvolatile memory in the first mode;
n is a positive integer more than or equal to 1;
the controller is configured to select another mode different from the first mode as the write mode when the controller receives a second instruction from the host;
the controller is configured to execute a write operation in the first mode or the other mode when the controller receives a write command from the host;
the controller is configured to select a second mode as the write mode when the controller receives the second instruction;
m-bit data is written into a memory cell of a second area of the nonvolatile memory in the second mode;
m is a positive integer more than n; and
the controller is configured to stop executing a write operation in the first mode when the controller receives from the host a fourth instruction indicating a target period of a data write period in the first mode, and a data write period in the first mode reaches the target period.

2. The storage device of claim 1, wherein
the first instruction is configured to enable the storage device to execute a write operation in the first mode; and
the second instruction is configured to disable the storage device from executing the write operation in the first mode.

3. The storage device of claim 1, wherein
the controller is configured to select the second mode as the write mode after the controller stops executing a write operation in the first mode.

4. A storage device connectable to a host, comprising:
a nonvolatile memory; and
a controller electrically connected to the nonvolatile memory, wherein
the controller is configured to select a first mode as a write mode to write data from the host to the nonvolatile memory when the controller receives a first instruction from the host;

n-bit data is written into a memory cell in a first area of the nonvolatile memory in the first mode;

n is a positive integer more than or equal to 1;

the controller is configured to select another mode different from the first mode as the write mode when the controller receives a second instruction from the host;

the controller is configured to execute a write operation in the first mode or the other mode when the controller receives a write command from the host;

the nonvolatile memory includes blocks, each of the blocks being a unit of data erase;

each of the blocks is an active block storing valid data and a free block storing no valid data;

the controller is configured to execute a free block generation operation to increase a number of the free blocks in the first area when the controller receives the second instruction; and the controller is configured to stop executing the free block generation operation when the controller receives a fifth instruction from the host after starting the free block generation operation, the fifth instruction indicating a target size of free blocks included in the first area, and a size of the free blocks included in the first area reaches the target size.

5. The storage device of claim 4, wherein the first instruction is configured to enable the storage device to execute a write operation in the first mode; and the second instruction is configured to disable the storage device from executing the write operation in the first mode.

6. The storage device of claim 4, wherein the controller is configured to select the other mode as the write mode after the controller stops executing a write operation in the first mode.

7. The storage device of claim 4, wherein the free block generation operation includes a garbage collection or a compaction.

8. The A storage device connectable to a host, comprising:

a nonvolatile memory; and a controller electrically connected to the nonvolatile memory, wherein the controller is configured to select a first mode as a write mode to write data from the host to the nonvolatile memory when the controller receives a first instruction from the host;

n-bit data is written into a memory cell in a first area of the nonvolatile memory in the first mode;

n is a positive integer more than or equal to 1;

the controller is configured to select another mode different from the first mode as the write mode when the controller receives a second instruction from the host;

the controller is configured to execute a write operation in the first mode or the other mode when the controller receives a write command from the host;

the nonvolatile memory includes blocks, each of the blocks being a unit of data erase;

each of the blocks is an active block storing valid data and a free block storing no valid data;

the controller is configured to execute a free block generation operation to increase a number of the free blocks in the first area when the controller receives the second instruction, and the controller is configured to stop executing the free block generation operation when the controller receives from the host a sixth instruction indicating a target execution time of the free block generation operation, and an execution time of the free block generation operation reaches the target execution time.

9. The storage device of claim 8, wherein a write performance includes at least one of a throughput and a latency.

10. The storage device of claim 8, wherein the first instruction is configured to enable the storage device to execute a write operation in the first mode; and the second instruction is configured to disable the storage device from executing the write operation in the first mode.

11. The storage device of claim 8, wherein the controller is configured to select the other mode as the write mode after the controller stops executing a write operation in the first mode.

12. The storage device of claim 8, wherein the free block generation operation includes a garbage collection or a compaction.

* * * * *